United States Patent
Kobayashi et al.

[11] Patent Number: 5,583,987
[45] Date of Patent: Dec. 10, 1996

[54] METHOD AND APPARATUS FOR INITIALIZING A MULTIPROCESSOR SYSTEM WHILE RESETTING DEFECTIVE CPU'S DETECTED DURING OPERATION THEREOF

[75] Inventors: Satoshi Kobayashi; Toshikazu Yokoi; Kunio Takahari; Yoichi Nakamura; Junichi Ishikawa, all of Kamakura, Japan; Nigel Bruce, Birmingham, United Kingdom; David Wright, Birmingham, United Kingdom; Colin Hough, Birmingham, United Kingdom

[73] Assignees: Mitsubishi Denki Kabushiki Kaisha, Tokyo, Japan; Apricot Computers Limited, Birmingham, England

[21] Appl. No.: 361,041

[22] Filed: Dec. 21, 1994

[30] Foreign Application Priority Data

Jun. 29, 1994 [GB] United Kingdom ............. 9413089

[51] Int. Cl.⁶ ............................................. G06F 11/00
[52] U.S. Cl. .................. 395/182.11; 395/183.21; 395/183.12; 395/182.09; 395/182.21
[58] Field of Search ............ 395/182.11, 183.12, 395/182.08, 182.09, 185.08, 183.21, 184.01, 182.21

[56] References Cited

U.S. PATENT DOCUMENTS

| | | |
|---|---|---|
| 4,070,704 | 1/1978 | Calle et al. |
| 4,191,996 | 3/1980 | Chesley. |
| 4,205,374 | 5/1980 | Bardsley, III et al. ......... 395/182.21 |
| 4,333,142 | 6/1982 | Chesley. |
| 4,521,847 | 6/1985 | Ziehm et al. ................. 395/182.21 |
| 4,553,204 | 11/1985 | Hashimoto ................... 395/182.21 |
| 4,757,442 | 7/1988 | Sakata ......................... 395/182.2 |
| 5,185,693 | 2/1993 | Loftis et al. ................. 395/182.11 |
| 5,235,700 | 8/1993 | Alaiwan et al. ............. 395/182.11 |
| 5,249,299 | 9/1993 | Iwata ........................... 395/182.14 |
| 5,274,797 | 12/1993 | Barlow et al. ............... 395/184.01 |
| 5,327,435 | 7/1994 | Warchol ....................... 395/183.12 |
| 5,333,285 | 7/1994 | Drerup ......................... 395/182.21 |
| 5,450,576 | 9/1995 | Kennedy ...................... 395/182.11 |

FOREIGN PATENT DOCUMENTS

| | | |
|---|---|---|
| 0486304 | 5/1992 | European Pat. Off.. |
| WO93/00628 | 1/1993 | WIPO. |
| WO94/08291 | 4/1994 | WIPO. |

*Primary Examiner*—Robert W. Beausoliel, Jr.
*Assistant Examiner*—Joseph E. Palys
*Attorney, Agent, or Firm*—Wolf, Greenfield & Sacks, P.C.

[57] ABSTRACT

A symmetric multiprocessor system connecting a plurality of CPUs by a common bus initializes itself while defective CPUs are set aside to use only the remaining CPUs when the power is turned on, thereby maintaining the predetermined CPU numbers and giving a minimum influence with the existing software thereof. The multiprocessor system includes an identifier setting register to designate in a predetermined order the CPU numbers only to normal CPUs, and a reset controller to cut off the defective CPUs from the common bus. The multiprocessor system can automatically start re-setting up where the defective CPUs are detected during the processing of setting-up based on the time-out detection, can release an abnormal state of the hardware, and can control the setting-up processing in use of any CPU based on the level of a reset status input port and contents of a reset information register.

29 Claims, 17 Drawing Sheets

CPU FAULT INFORMATION
IN
CPU CONFIGURATION CONTROL INFORMATION

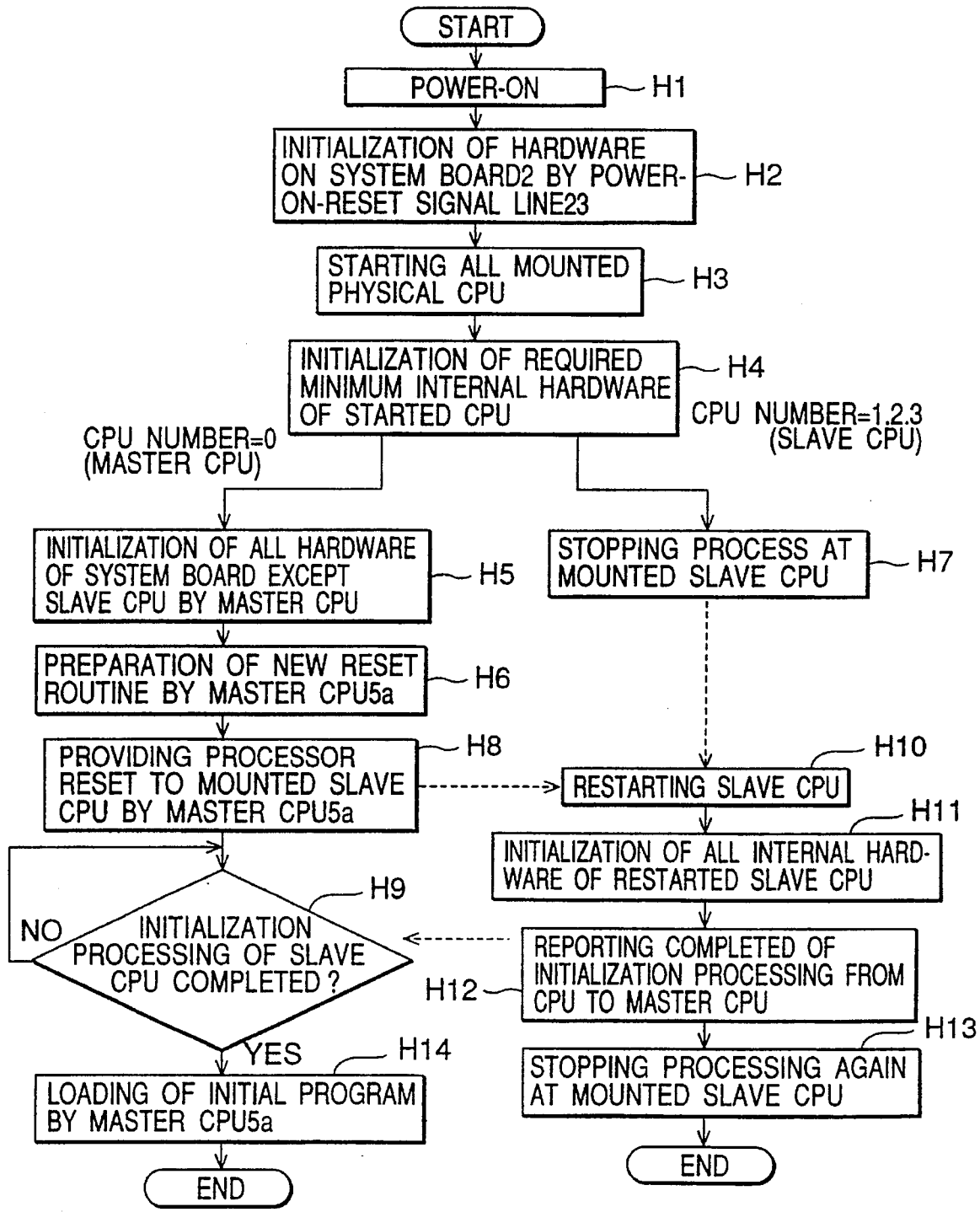

METHOD AND APPARATUS FOR INITIALIZING A MULTIPROCESSOR SYSTEM WHILE RESETTING DEFECTIVE CPU'S DETECTED DURING OPERATION THEREOF

BACKGROUND OF THE INVENTION

1. Field of the Invention

This invention relates to a multiprocessor system connecting by a common bus a plurality of processors (CPU; Central Processing Unit) for implementing processings of input/output (I/O) and programs and, more particularly, to a setting-up technique for a symmetric multiprocessor system capable of implementing processings of I/Os and programs at an arbitrary processor.

2. Description of the Related Art

FIG. 16 is a block diagram showing a conventional information processing apparatus, as a symmetric multiprocessor system, having a plurality of CPUs. In FIG. 16, numeral 1 is the information processing apparatus; numeral 2 is a system board; numeral 3 is a CPU bus; numeral 4 is a main memory; numerals 5a to 5d are physical CPUs, assigned with CPU number 0 to 3, transferable of data to and receivable of data from, respectively, the CPU bus 3; numeral 6 is a bus bridge located between the CPU bus 3 and a local bus 7 connecting with peripheral equipment controllers and the like; numerals 8a to 8d are peripheral equipment controllers for controlling equipments of a CRT 9, a keyboard 10, a floppy disk unit 11, a magnetic disk unit 12, respectively, and for transmitting and receiving data to and from the main memory 4; numeral 13 is a ROM for storing an initialization program for setting-up the system when the power is turned on, numeral 14 is a nonvolatile RAM for storing system configuration information indicating such as mounting circumstances of physical CPUs 5a to 5d and configuration information of peripheral equipments.

Numeral 22 is a power-on-reset generator for producing power-on-reset signals for initializing hardware on the system board 2 where the power is turned on; numeral 23 is a power-on-reset signal line for feeding the power-on-reset signals from the power-on-reset generator 22 to the system board 2; numerals 24a to 24d are logical CPU number designation lines, fixedly corresponding to the physical CPUs 5a to 5d, for designating logical CPU numbers of the physical CPUs 5a to 5d.

Now, referring to a flow chart shown in FIG. 17, an initialization operation of the system according to the configuration above will be described. It is presumed that the physical CPU 5a is required to be mounted for operation as a master CPU and that, though all the physical CPUs 5b to 5d are not required to be mounted, they operate as slave CPUs when mounted.

Upon turning the power on of the information processing apparatus 1 (step H1), the power-on-reset generator 22 produces the power-on-reset signal on the power-on-reset signal line 23, and resets the physical CPUs 5a to 5d and the hardware, capable of being reset, provided on the system board 2, then to initialize them (step H2). When the power-on-reset signal indicates as disable, all the mounted physical CPUs 5a to 5d start to implement an initialization program from a specific address in the ROM 13 for storing initialization program. The starting addresses are the same among all the physical CPUs 5a to 5d, and the single initialization program is processed (step H3). The physical CPUs 5a to 5d implement the program in the ROM 13 for storing initialization program and initialize respective required minimum internal hardware. At that time, all the physical CPUs 5a to 5d operates in parallel (step H4).

It is presumed, hereinafter, that the physical CPU 5a assigned to the logical CPU number 0 operates as a master CPU (hereinafter, the physical CPU 5a may be called as a master CPU) and that the other mounted physical CPUs 5b to 5d respectively assigned to the logical CPU numbers 1 to 3 operate as slave CPUs (similarly, hereinafter, the physical CPUs 5b to 5d may be called as slave CPUs). Each physical CPU 5a to 5d, by reading the value at the corresponding logical CPU number designation line 24a to 24d, recognizes the own logical CPU number and judges whether the CPU is the master or slave by itself.

The master CPU 5a implements the program in the ROM 13 for storing initialization program, thereby initializing the entire hardware on the system board 2 except the internal hardware of the master CPU 5a and the slave CPUs (step H5). The master CPU 5a prepares on the main memory 4 a new reset routine existing in the ROM 13 for storing initialization program (step H6). During the process of the master CPU 5a at steps H5, H6, the slave CPUs 5b to 5d stop the processing, and wait for processor reset given from the master CPU 5a (step H7).

The master CPU 5a implements the reset routine in the ROM 13 for storing initialization program, provides the processor reset to all the mounted slave CPU 5b to 5d based on the CPU configuration information stored in the nonvolatile RAM 14 for storing system configuration information (step H8), and waits for report of the completion of initialization for all the mounted slave CPUs (step H9).

During this period, the slave CPUs 5b to 5d, which had stopped the processing, restart upon the processor reset provided from the master CPU 5a, start implementing the new initialization program prepared at step H6 on the main memory 4 (step H10), and initialize the internal hardware of each slave CPU by parallel implementing the initialization program (step H11). The slave CPUs 5b to 5d which have completed the initialization of the internal hardware individually report the completion of initialization to the master CPU 5a (step H12) and then stop the processing again (step H13).

The master CPU 5a, upon receiving the completion report of initialization from those slave CPUs 5b to 5d, starts loading of an initial program from either the floppy disk unit 11 or the magnetic disk unit 12. By this operation, the operating system is set up, and the system of the information processing apparatus 1 starts its operation (step H14).

It is to be noted that the CPU configuration information stored in the nonvolatile RAM 14 for storing the system configuration information is given where a program for altering configuration information registration from either the floppy disk unit 11 or the magnetic disk unit 12 is started and where an operator controls the keyboard in accordance with instructions being displayed on the CRT 9.

As described above, since the conventional symmetric multiprocessor system having a connection by the common bus is thus constituted, the system's constitution is not that each CPU individually implements the initialization process or that the system operation is possible by degenerating defective CPUs, so that the defective CPUs occupy the common bus thereby preventing the system in assistance with other normal CPUs from being set up properly. As the case where the system cannot be set up, It is exemplified, in case that the initialization processing of the master CPU is faulty and, further, in case that the initialization processing of the slave CPU is faulty, the slave CPUs at which a fault occurs may occupy the common bus, thereby stopping the setting-up processing of the system.

In such a situation, even the master CPU monitoring the slave CPUs cannot continue the processing because the system cannot use the common bus, and therefore, it is difficult to set aside the malfunctioning CPUs, as well as the system cannot perform degenerate operation in which the defective CPUs are automatically cut out. Consequently, if a malfunction of the CPU occurs, the system is required to be restarted after any defective CPU is found and physically removed. Therefore, there are problems that, at the occurrence of the fault, urgent manual work is inevitable, that the system becomes useless since it would take so much time to repair the system, and that the system cannot perform an automatic operation by automatic power-on.

In addition, although a CPU having a specific CPU number must exist in order to maintain compatibility with existing software, a normal CPU must be mounted onto a predetermined position because the CPU number of each CPU is fixed at its position to be mounted. Therefore, a problem raises in which it would take so much time to recover the system by works of removing defective CPUs and rearranging normal CPUs.

Since the nonvolatile RAM 14 for storing system configuration information which stores the configuration information of the CPUs is connected to the common bus accessible only from the CPUs, if malfunction of the CPU occurs to force the system to be unable to set up, it is required that first the defective CPUs are found and removed and then the configuration information has to be altered where the hardware is constituted of only normal CPUs. Moreover, since a special program for altering configuration information registration must be executed by normal CPUs to alter the configuration information, the system cannot be handled by remote control, and has to be subject to a poor maintenance. A configuration of the system tends to become a large scale to add functions of automatic degeneration or remote control, because the system has used general-purpose microprocessors and general-purpose chips for peripheral control.

On the other hand, non-stop type computers and general-purpose computers are conventionally equipped with a constitution enabling each CPU to individually implement initialization processing or with a constitution degenerating defective CPUs to start the operation of the system. However, each CPU has a large scale, and the system is equipped with a large-scale exclusive service processor for processing of setting-up or degeneration, so that such computers cost so much.

SUMMARY OF THE INVENTION

This invention is accomplished to solve the problems described above. It is an object of the invention to provide a cost-effective, symmetric multiprocessor system in which, by enabling the system to assign CPU numbers to only normal CPUs always in a constant order where defective CPUs are automatically degenerated, the system can start its operation with only normal CPUs without grossly affecting the software and in which specific CPUs can be degenerated by confirming defective CPUs from a remote control.

A multiprocessor system according to the invention is capable of setting-up itself while cutting out defective CPUs from a common bus thereof. The system characterized in comprising: a single ROM, provided to the common bus which connects a plurality of CPUs, for storing initialization program for setting-up the system when the power of the system is turned on; a single nonvolatile RAM, provided to the common bus, for storing system configuration information indicating mounting status of the plurality of CPUs; an identifier setting register, connected to the common bus, capable of assigning to and reading from an arbitrary CPU a CPU number, for designating assigned CPU numbers to the respective CPUs; a reset controller, connected to each CPU through a CPU individual hardware reset line, for controlling the CPUs individually into a reset state by rendering the CPU individual hardware reset line enable and into a setting-up state by rendering the corresponding CPU individual hardware reset lines disable based on start request information of each CPU, the reset controller having a time-out detection mechanism for monitoring completion of initialization of each CPU, stopping the operation of the time-out detection mechanism based on report information indicating the completion of initialization of each CPU, and cutting off from the system, at a time of the time-out detection conducted by the time-out detection mechanism, the corresponding CPUs whose records indicates a fault occurrence, thereby initializing the entire hardware by providing system reset request for entirely resetting a system board; a reset status input port reading the status of each CPU individual hardware reset line and enabling an arbitrary CPU to read the read status through the common bus; and a reset information register for holding the start request information of the selected CPUs and the report information of the completion of initialization of those CPUs given from an arbitrary CPU through the common bus, transmitting the start request information and the report information to the reset controller, and enabling an arbitrary CPU to read the start request information and the report information through the common bus.

In the multiprocessor system, the identifier setting register designates the CPU numbers in the predetermined order only to normal CPUs; the reset controller cuts off defective CPUs from the common bus, detects defective CPUs based on the time-out detection during the processing of setting-up, starts re-setting up automatically, and releases an abnormal state of the hardware at a time of the time-out during the processing of setting-up; and an arbitrary CPU mainly controls the processing of setting-up based on the reset status input port and the reset information register.

According to an embodiment of the invention, the identifier setting register includes registers of a number corresponding to the CPUs connected to the common bus, and that all values of the identifier setting register are set to the CPU number of a master CPU upon receiving of a system reset signal and also, only at any register that the CPU individual hardware reset lines are enable, are set to a value from the common bus. Therefore, at an arbitrary time, all register has the CPU number of the master CPU, and at one writing cycle the registers at which the CPU individual hardware reset line is enable are written with the designated values, so that disable registers are not subject to changes logically and electrically.

The reset controller maintains the CPU individual hardware reset lines corresponding to CPUs which are logically to be cut off from the system, to be enable. This system can easily apply to a system which uses general purpose LSIs. The reset controller monitors the processing of setting-up of each CPU through the time-out detection mechanism and, when the time-out is detected, cuts off the CPUs from the processing of setting-up thereafter. Therefore, the CPUs at which a fault occurs during setting-up are temporarily cut off from the system, thereby setting aside the defective CPUs from the system so that the system automatically starts its degenerate operation, so that the system surely carries out an automatic operation. The reset controller controls an arbitrary CPU to execute instructions from the same address in the ROM for storing initialization program by rendering the CPU individual hardware reset line disable. Since all the CPUs start from such a specific address, all the CPUs can be set up by a single ROM for storing initialization program, so that the system would be inexpensive. The reset controller controls one CPU to start as a master CPU, monitors the master CPU's processing of setting-up through the time-out detection mechanism, and, when the time-out is detected, retries the processing of setting-up after resetting all hardware except the reset controller. Therefore, the system is able to escape from an abnormal state of the hardware at the time of time-out of setting-up processing, to elevate certainty of successful re-setting up, and to identify the defective CPUs readily.

The master CPU recognizes itself as a master CPU when the CPU individual hardware reset line is made disable at only 1 bit, and recognizes the physical CPU number from the position of the disable bit. Therefore, the master CPU is smoothly set up, and the system is inexpensively accomplished with less amount of its hardware.

The master CPU selects, based on the CPU configuration information in the nonvolatile RAM, CPUs which start initialization processing as slave CPUs, determines the CPU number to set at the identifier setting register, and sequentially gives a start of the initialization processing at each slave CPU with confirming the completion of the processing. The system therefore can easily identify the defective CPUs with less amount of its hardware. The slave CPU recognizes itself as a slave CPU when the CPU individual hardware reset line are made disable at 2 bits or more. Therefore, the slave CPU can be set up smoothly and with less amount of its hardware. In accordance with another embodiment of the invention, a multiprocessor system is characterized in that the system further comprises a system monitor, connected through a reset channel for transmitting data to and from the reset controller, having CPU configuration control information for retaining fault information of each CPU. Therefore, the records of the CPUs at which a fault occurs can be maintained in the CPU configuration control information after the power of the system board is turned off, so that the records of the defective CPUs can be used commonly at the following setting-up processings even after the power is turned off, so that the system can confirm the defective CPUs at any time and would be set up with a shortened processing time at the following cycle as well as improving a task for its maintenance.

The reset controller cuts off defective CPUs from the system based on the CPU configuration control information, thereby enabling the system to be cut off from unstable CPUs by designating them previously, and thereby improving the system's maintenance task and applicability of its usage.

The reset controller monitors reading of the CPU configuration control information from the system monitor by the time-out detection mechanism and continues, when the time-out is detected, the processing of setting-up while assuming all CPUs as normal.

Therefore, when the time-out is detected, by continuing the setting-up processing while all the CPUs are considered as normal, the system can complete setting-up even if a fault occurs at the system monitor, and enhance its usage. Moreover, if the time-out is detected, the fault occurrences of the CPUs are recorded in the CPU configuration control information. Therefore, by retaining the records of the defective CPUs in the system monitor, the system can use them for the following setting-up even after the power is turned off and can also confirm the states of the defective CPUs at an arbitrary timing. The system, since automatically cutting off such CPUs from the following setting-up processing, can improve a task of its maintenance and its reliance and shorten its setting-up time.

BRIEF DESCRIPTION OF THE DRAWINGS

FIG. 17 is a flow chart showing the entire flow of the system initialization processing according to the conventional system.

DESCRIPTION OF THE PREFERRED EMBODIMENTS

EXAMPLE 1

Figure 1:
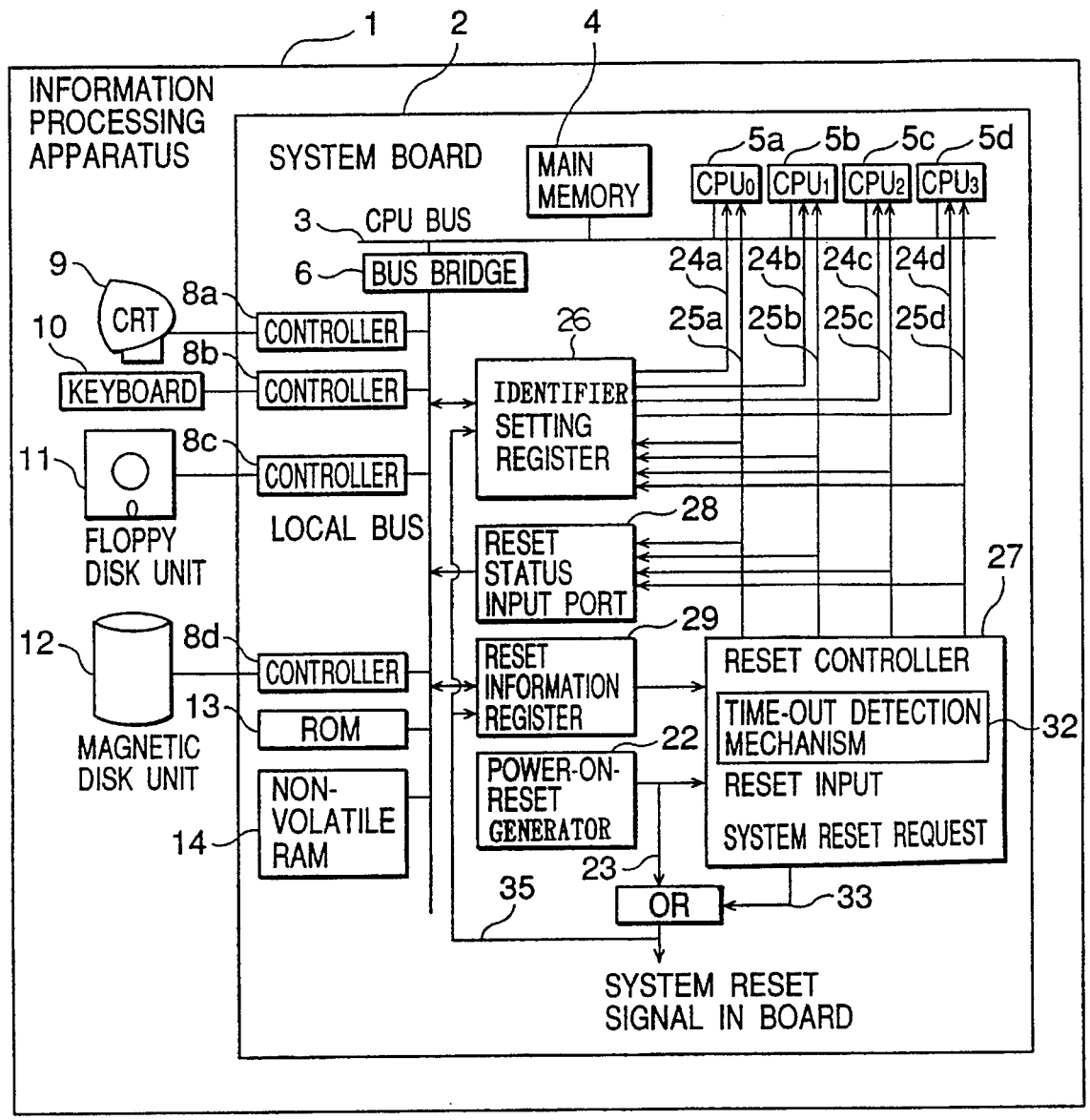
FIG. 1 is a block diagram showing an information processing apparatus as a symmetric multiprocessor system according to Example 1 of the invention.
Figure 16:
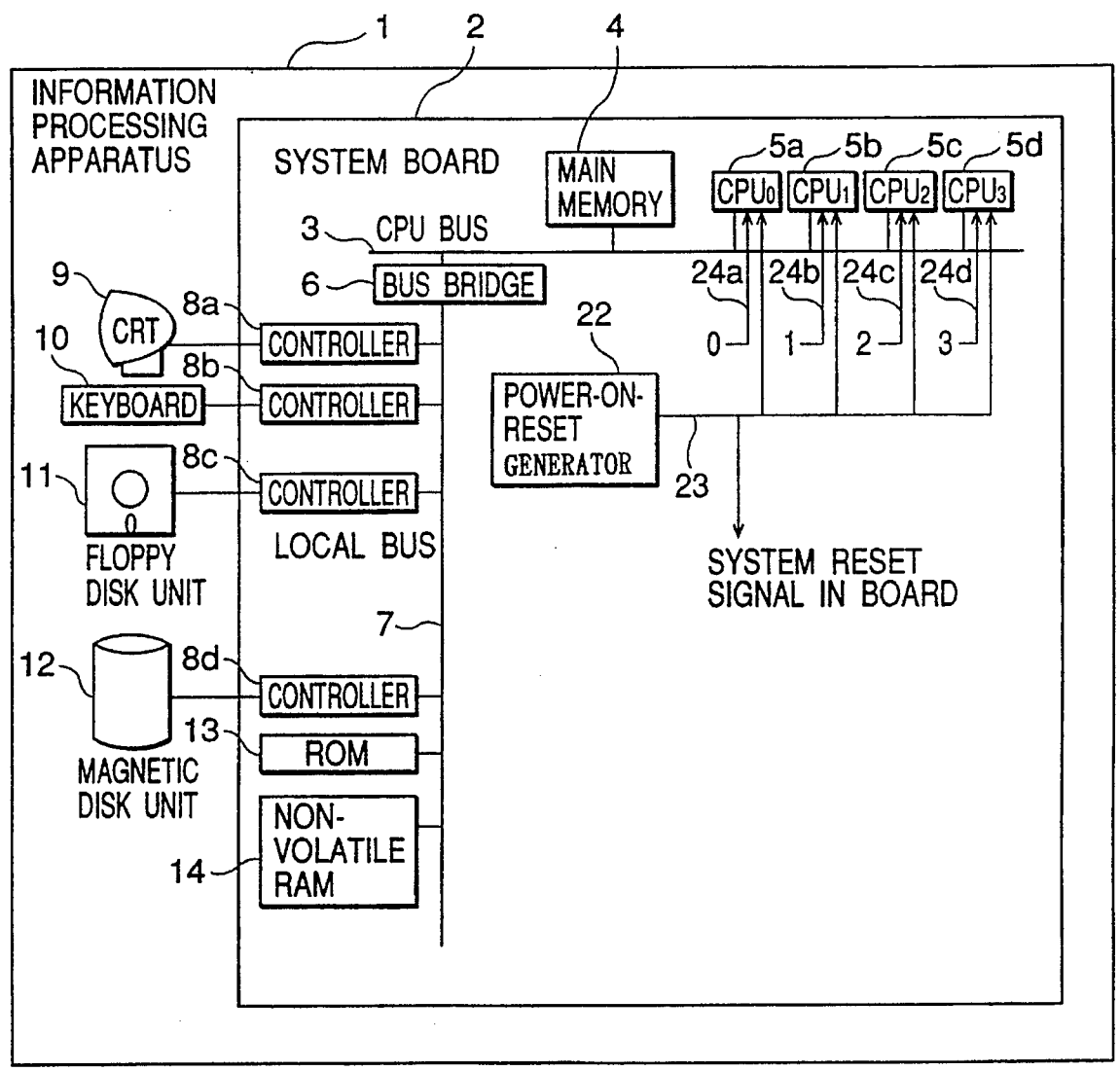
FIG. 16 is a block diagram showing an information processing apparatus as a conventional symmetric multiprocessor.

Referring to the drawings, Example 1 of the invention will be described. FIG. 1 is a block diagram showing an information processing apparatus as a symmetric multiprocessor system according to Example 1 of the invention. In FIG. 1, the same numerals as in FIG. 16 show the same portions as of the conventional; numeral 1 is the formation processing apparatus constituted as a symmetric multiprocessor system connected by a common bus; numeral 2 is a system board mounting a plurality of CPUs and mounting controllers for peripheral equipments, numeral 3 is a CPU bus capable of transmitting data with high speed, connecting with the plurality of the CPUs and a main memory; numeral 4 is the main memory for storing common data for the plurality of the CPUs and the peripheral equipments; numerals 5a to 5d are physical CPUs assigned to logical CPU number 0 to 3, respectively capable of transmitting to and receiving from the CPU bus 3.

Numeral 6 is a bus bridge located between the CPU bus 3 and a local bus connected with the peripheral equipment controllers; the bus bridge prevents the high speed operation of the CPU bus from being affected by the low speed operation of the peripheral equipment controllers and provides a logical equivalent between both buses as seen from the physical CPUs 5a to 5d. Numeral 7 is a local bus for low speed data transmission, connected to the peripheral equipment controllers and the like; numerals 8a to 8d are peripheral equipment controllers for controlling the peripheral equipments and for communicating data with the main memory 4; numeral 9 is a CRT displaying operation status and whatever; numeral 10 is a keyboard for giving instructions to the information processing apparatus 1; numeral 11 is a floppy disk unit for reading and writing data of a floppy disk; and numeral 12 is a magnetic disk unit for retaining the operating system and large capacity data.

Numeral 13 is a ROM for storing initialization program to retain the program for setting-up the system when the power is turned on; numeral 14 is a nonvolatile RAM for storing system configuration information to retain the system configuration information, such as the number of CPUs in the information processing apparatus 1, configuration information about peripheral equipments and the like; numeral 22 is a power-on-reset generator for producing a power-on-reset signal for initializing the hardware of the system board 2 when the power is turned on; numeral 23 is a power-on-reset signal line for feeding the power-on-reset signal from the power-on-reset generator 22 to the system board 2; numerals 24a to 24d are logical CPU number designation lines for designating logical CPU numbers of the physical CPUs 5a to 5d.

As a new configuration of Example 1: numerals 25a to 25d are CPU individual hardware reset lines for feeding hardware reset signals individually to the physical CPUs 5a to 5d; numeral 26 is an identifier setting register for setting logical CPU numbers fed to the physical CPUs 5a to 5d; numeral 27 is a reset controller for controlling resets of individual hardware of the physical CPUs 5a to 5d; numeral 28 is a reset status input port for reading status of the CPU individual hardware reset line 25a to 25d of the physical CPUs 5a to 5d; numeral 29 is a reset information register for transmitting, from the physical CPUs 5a to 5d to the reset controller 27, completion reports of initialization of the physical CPUs 5a to 5d and starting requests of the selected physical CPUs 5a to 5d; numeral 32 is a time-out detection mechanism, incorporated in the reset controller 27, for monitoring completion of initialization of the physical CPUs 5a to 5d; numeral 33 is a system reset request line for resetting all the hardware on the system board 2 extending from the reset controller 27; numeral 34 is an OR circuit for producing logical summation of the system reset request of the system reset request line 33 and the power-on-reset signal of the power-on-reset signal line 23; numeral 35 is a system reset signal line for feeding output of the OR circuit 34 to reset inputs of all the hardware of the system board 2.

Figure 2:
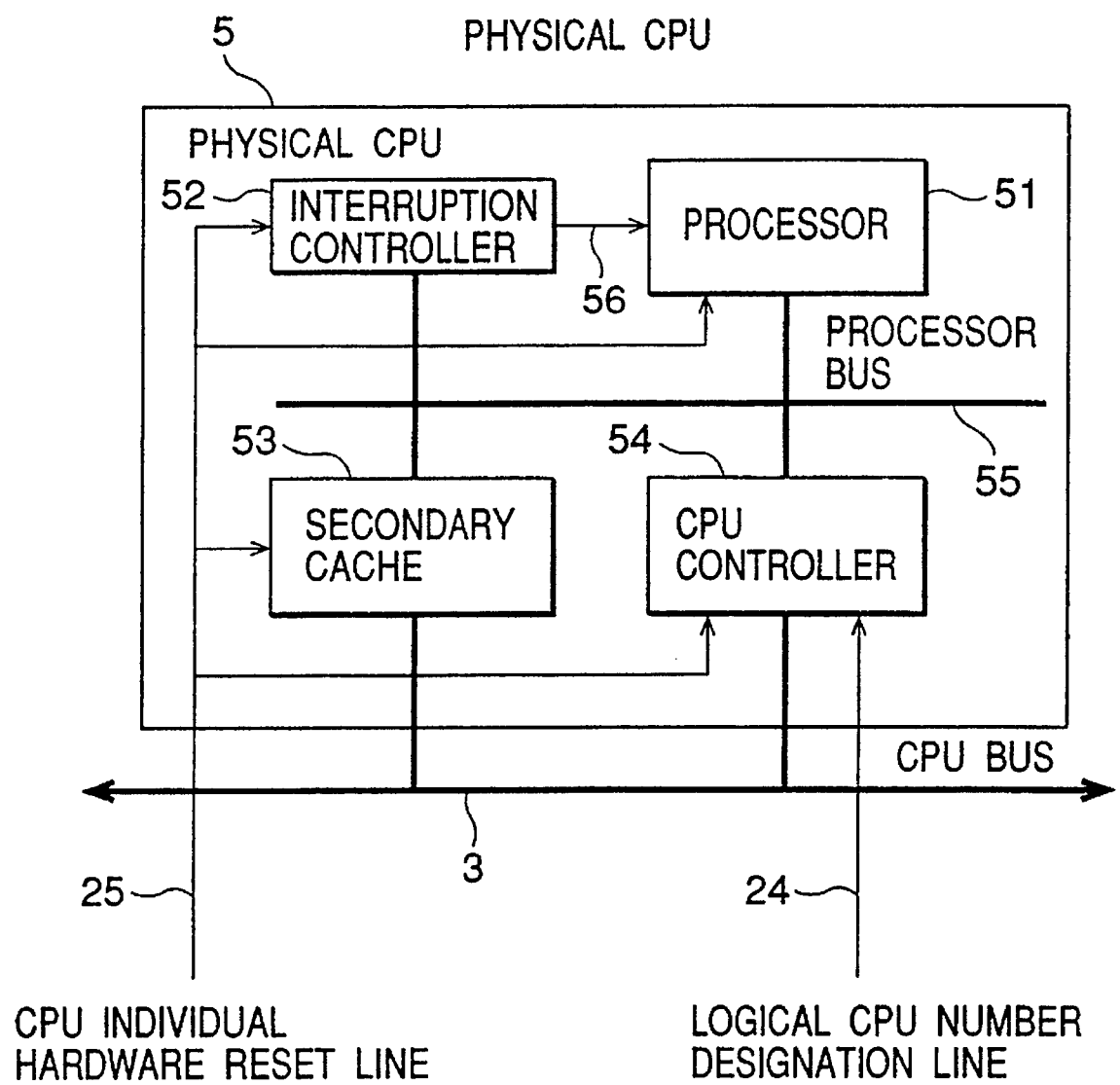
FIG. 2 is a functional block diagram showing a physical CPU according to Example 1 of the invention.

FIG. 2 is a block diagram showing an internal configuration of the physical CPUs 5a to 5d shown in FIG. 1. In FIG. 2, numeral 5 is the general numeral of the physical CPUs 5a to 5d; numeral 51 is a processor for processing data, which is formed of a general-purpose microprocessor in use of such as personal computers, and the processor initializes the internal state by the CPU individual hardware reset lines 25 (general numeral of 25a to 25d) and starts implementing instructions from a specific address at a time that the signal becomes disable. The starting address is the common for all the physical CPUs 5a to 5d. Numeral 52 is an interruption controller for controlling interruption requests from the outside and transmitting a single interruption request to the processor 51; numeral 53 is a secondary cache to comply with high speed data requests from the processor 51 by temporarily storing the data of the main memory 4; numeral 54 is a CPU controller for controlling interface processing for the CPU bus 3 and controlling the hardware in the physical CPUs 5a to 5d, and performs data transmission processing on the CPU bus 3 in conjunction with the logical CPU numbers designated by the logical CPU number designation lines 24 (general numeral of 24a to 24d). Numeral 55 is a processor bus for high speed data transmission in the physical CPUs 5a to 5d.

Although the processor 51, the interruption controller 52, the secondary cache 53, and the CPU controller 54 are made of general purpose LSIs, the physical CPUs 5a to 5d are logically cut off from the CPU bus 3 by rendering the data transmission to the CPU bus 3, data output, and the like entirely disable, because by retaining the CPU individual hardware reset lines 25 the reset input terminals are kept enable thereby fixing the LSI logically to an initial status.

Figure 3:
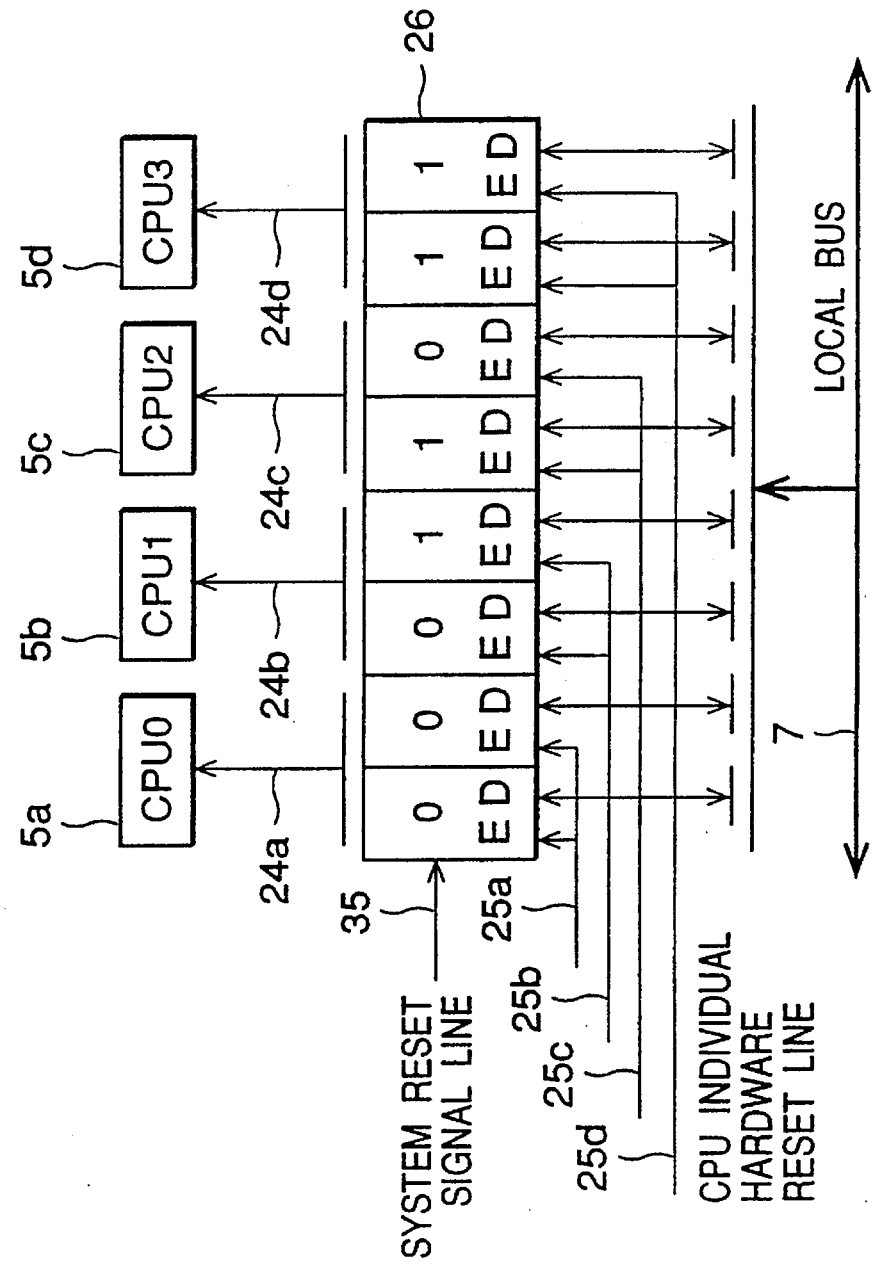
FIG. 3 is a functional block diagram showing an identifier setting register according to Example 1 of the invention.

FIG. 3 is a block diagram describing the functions of the identifier setting register 26 shown in FIG. 1. In FIG. 3, illustrated is that all register contents are initialized to zero as the logical CPU number of the master CPU by the system reset signal line 35, and that input data from the local bus 7 are set at the register portion at which the CPU individual hardware reset line 25 is enable. In this example, 2-bit register is provided at each physical CPUs 5a to 5d, thereby enabling to designate four kinds of the CPU numbers and to be accessed as an one bite register from the local bus 7. Input terminal D shown at each register is a data input terminal connected to the local bus 7 and receives setting requests of input data only when the corresponding input terminal E is enable. Thus, one of the physical CPUs 5a to 5d can set, by a batch writing processing implemented by bite unit, only the CPU numbers of the other of the physical CPUs 5a to 5d out of operation, and can prevent the data corresponding to the physical CPUs 5a to 5d in operation from changing logically and electrically.

Figure 4:
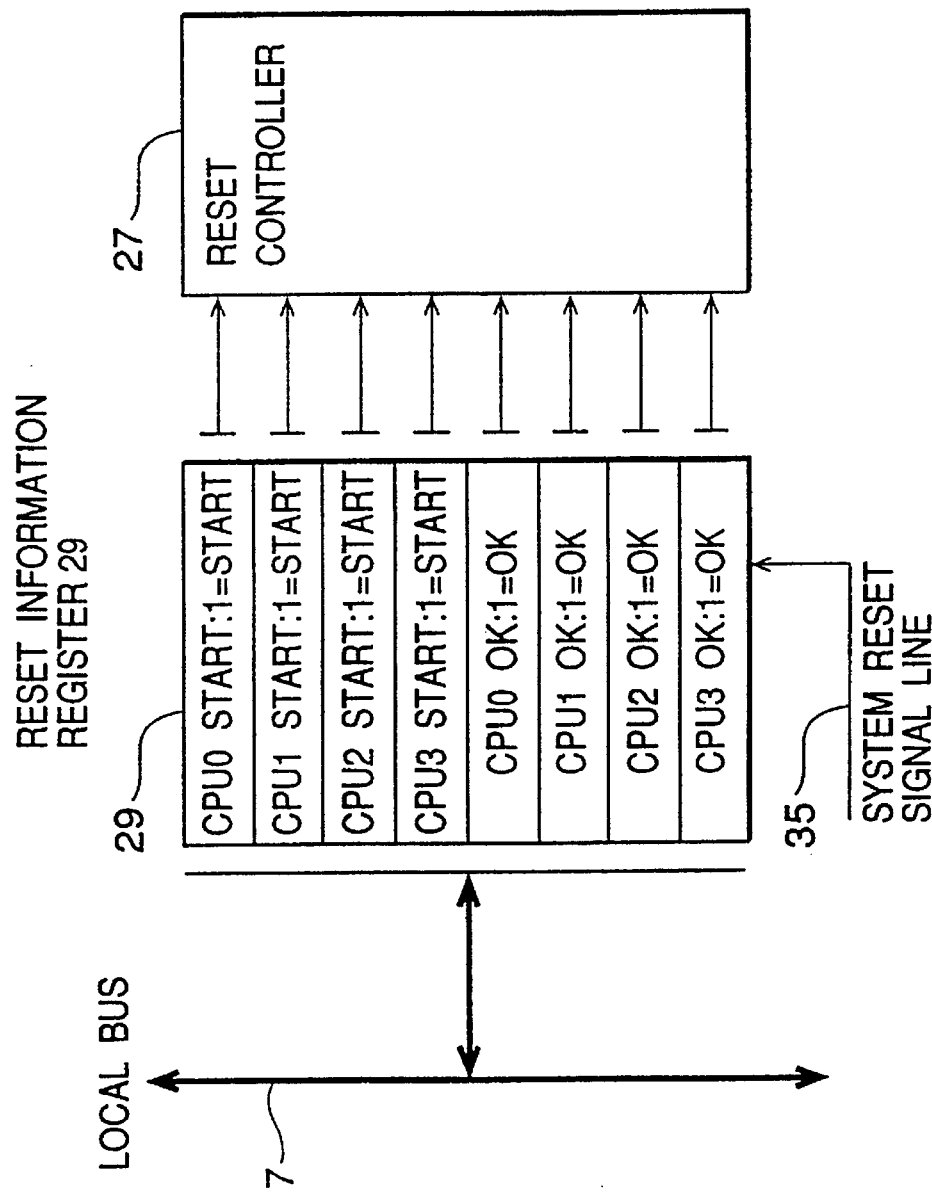
FIG. 4 is a functional block diagram showing a reset information register according to Example 1 of the invention.

FIG. 4 is a block diagram showing a configuration of the reset information register 29 shown in FIG. 1. In FIG. 4, illustrated is that all register contents are initialized to zero by the system reset signal line 35, that an arbitrary register can be read to or written from the physical CPUs through the local bus 7, and that each bit is read from the reset controller 27. The upper four bits among bits of each register are bits for requesting start of the physical CPU 5a to 5d selected by the reset controller 27 from the physical CPUs 5a to 5d. When a bit corresponding to the selected physical CPU 5a to 5d is set to a value 0, the reset controller 27 starts the corresponding physical CPUs 5a to 5d by rendering the CPU individual hardware reset line fed to the corresponding physical CPU 5a to 5d disable. On the other hand, the lower four bits are bits for reporting the completion of initialization of the selected physical CPU 5a to 5d from the physical CPU 5a to 5d to the reset controller 27. The reset controller 27 ceases operation of the time-out detection mechanism 32 by setting a value 1 to a bit of the corresponding physical CPU 5a to 5d.

Figure 5:
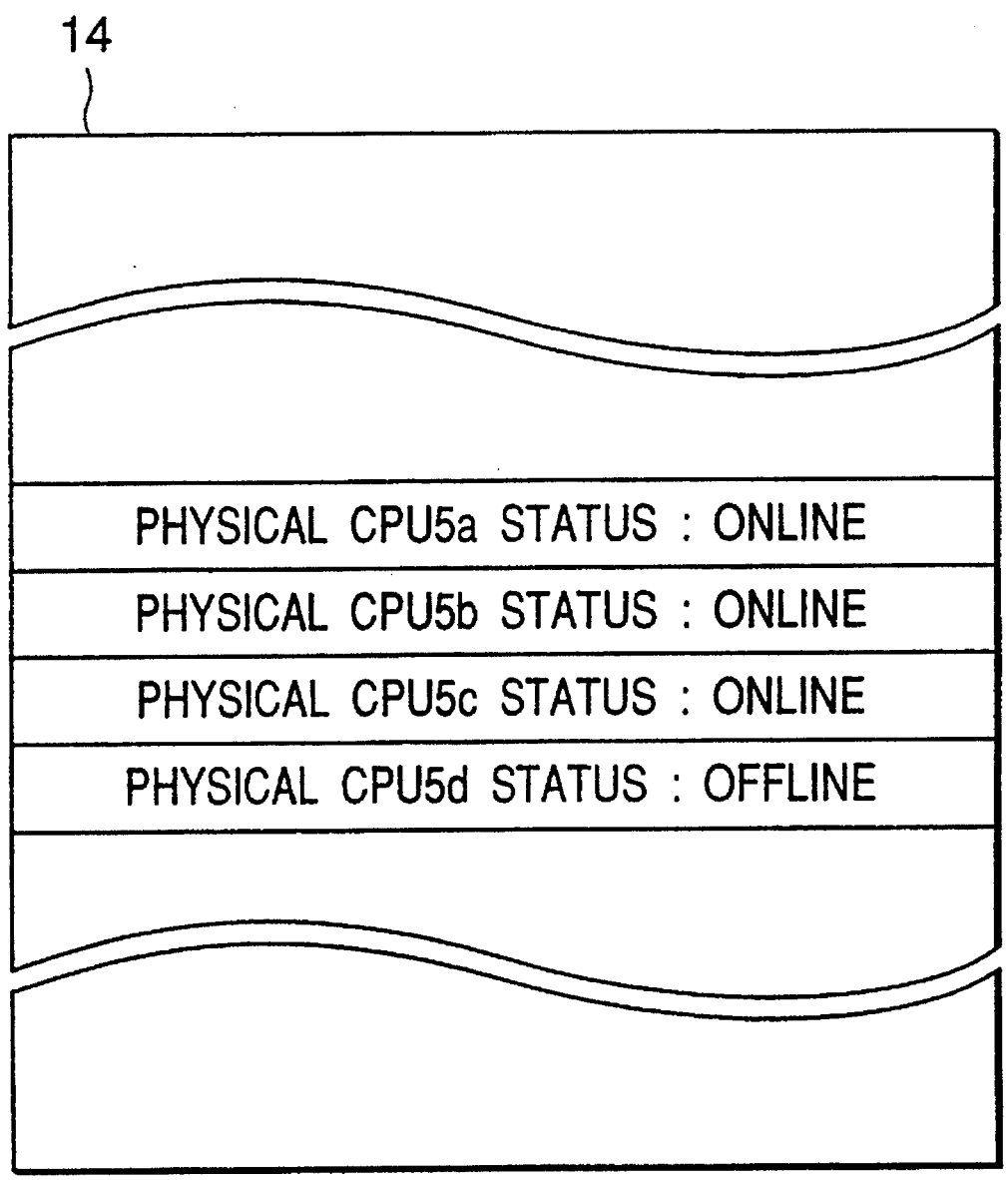
FIG. 5 is a schematic diagram illustrating contents of CPU configuration information in a nonvolatile RAM for storing system configuration information according to Example 1 of the invention.

FIG. 5 is a diagram showing a part regarding to CPU configuration information in the contents of the nonvolatile RAM 14 for storing system configuration information shown in FIG. 1. Each data shows mounting status of the corresponding physical CPU 5a to 5d. This example shows that only the physical CPU 5d is at the off-line state. In general, the data are used for prohibiting start of unnecessary initialization, removal from the system operation, and the like, by designating the physical CPU which is not physically mounted as the off-line, and even if the CPU is mounted, the physical CPU at which the off-line is designated cannot be used when the system operates. The data can be changed only by executing a program for altering configuration information registration regarding to any physical CPU 5a to 5d.

Referring to a time chart shown in FIG. 6 and flow charts shown in FIGS. 7 to 11, the operation of the information processing apparatus according to Example 1 which is thus constituted will be described. First, FIG. 6 is a time chart showing an operation of the hardware between times immediately after the power is turned on and of start of the master CPU.

Figure 6:
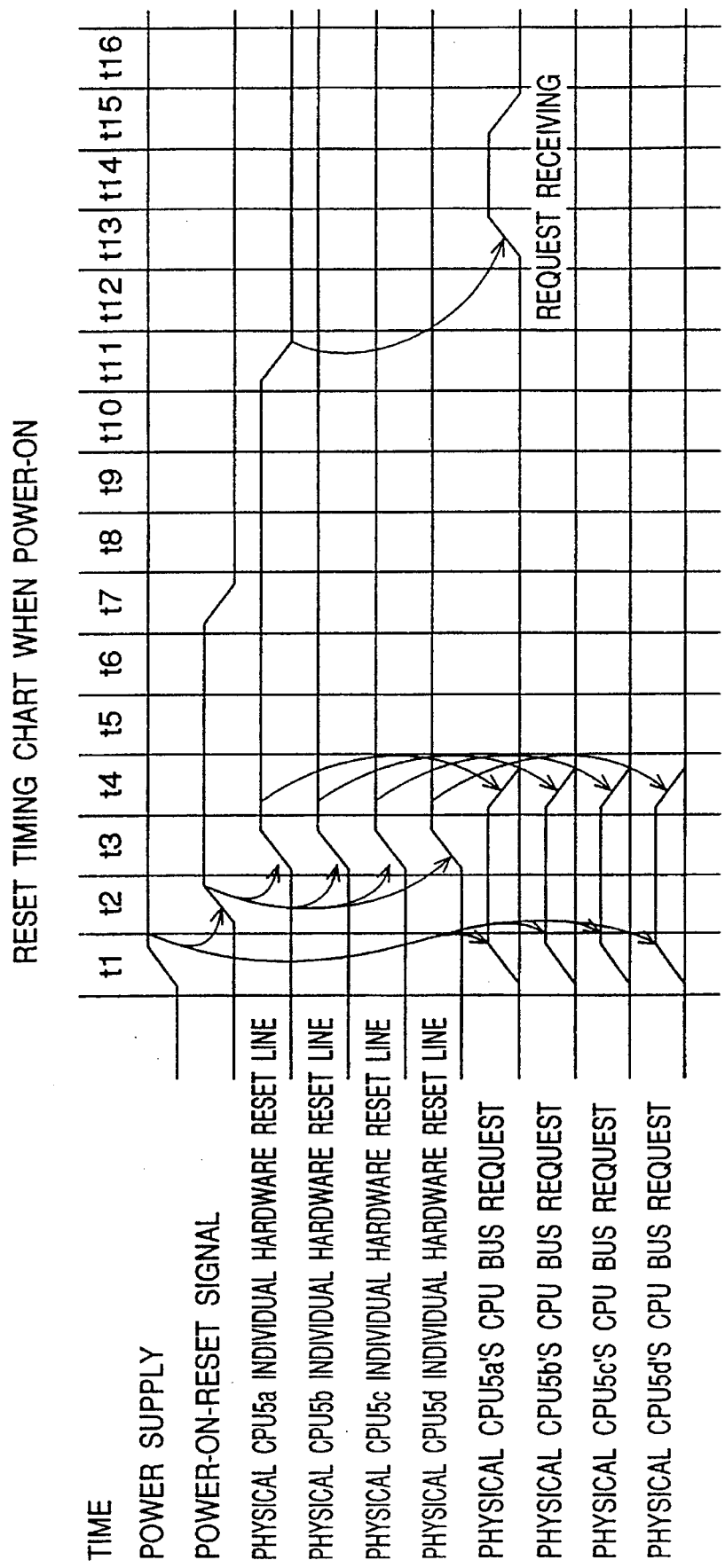
FIG. 6 is a time chart showing reset timing when the power is turned on according to Example 1 of the invention.

In FIG. 6, illustrated is that the power is supplied to the physical CPUs 5a to 5d by turning the power on at time t1 thereby rendering the bus request to the CPU bus 3 uncertain state, and that all the bus requests becomes disable as a result that, upon that the power-on-reset signal line 23 becomes enable, the hardware of the reset controller 27 is initialized thereby rendering the CPU individual hardware reset line 25 enable. When the power-on-reset becomes disable at time t7, the reset controller 27 starts the processing of setting-up.

In this example, the reset controller 27 selects the physical CPU 5a as the master CPU and makes the corresponding CPU individual hardware reset line 25a disable at time t11, thereby providing the bus request to the CPU bus 3 at time t13 because the started physical CPU 5a reads the instructions from the predetermined instruction address. The bus request is made disable at time t15 in response to receiving of the request, and then, the physical CPU 5a starts to read the instructions.

Figure 7:
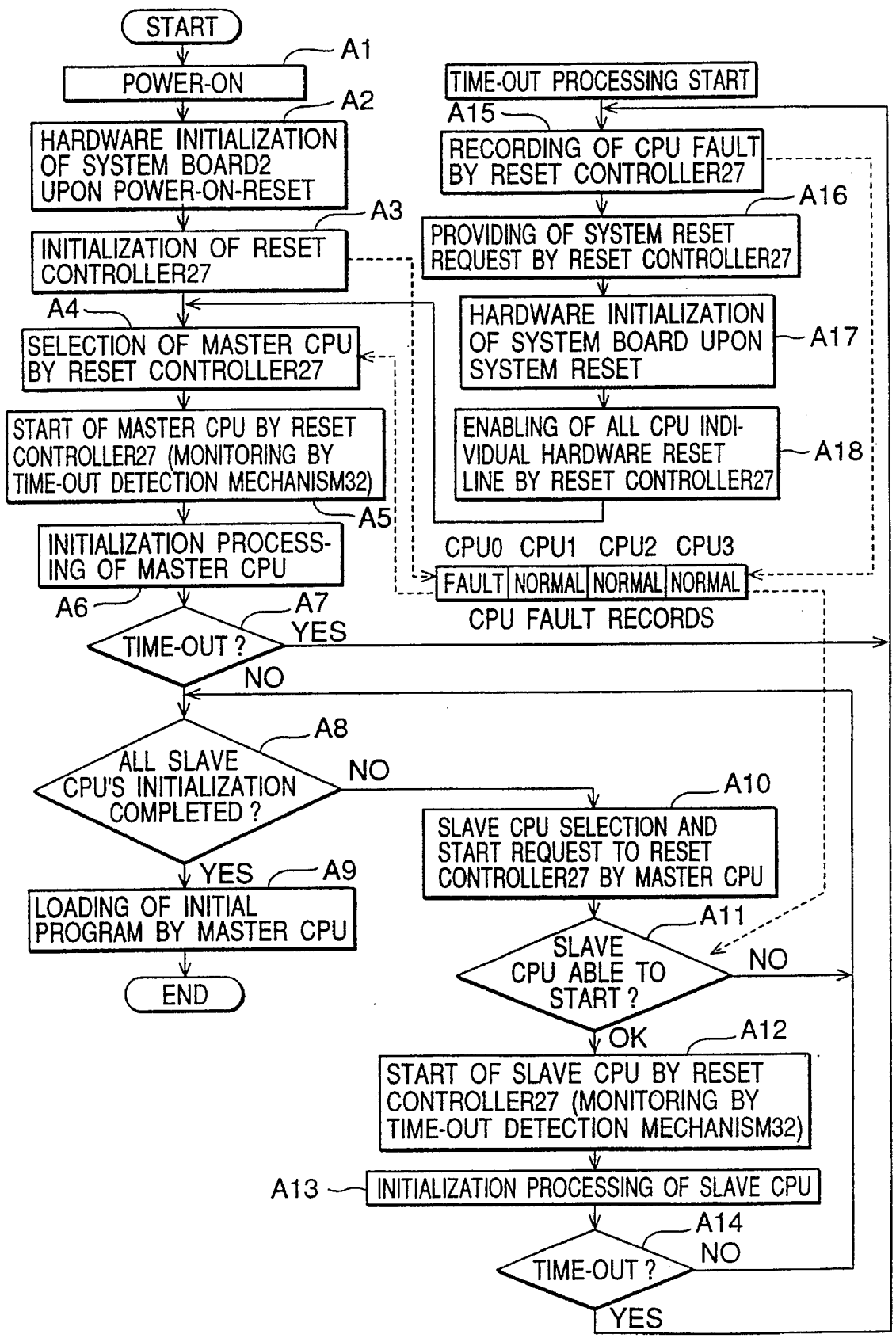
FIG. 7 is a flow chart showing the entire flow of the processing of initialization of the system according to Example 1 of the invention.
Figure 8:
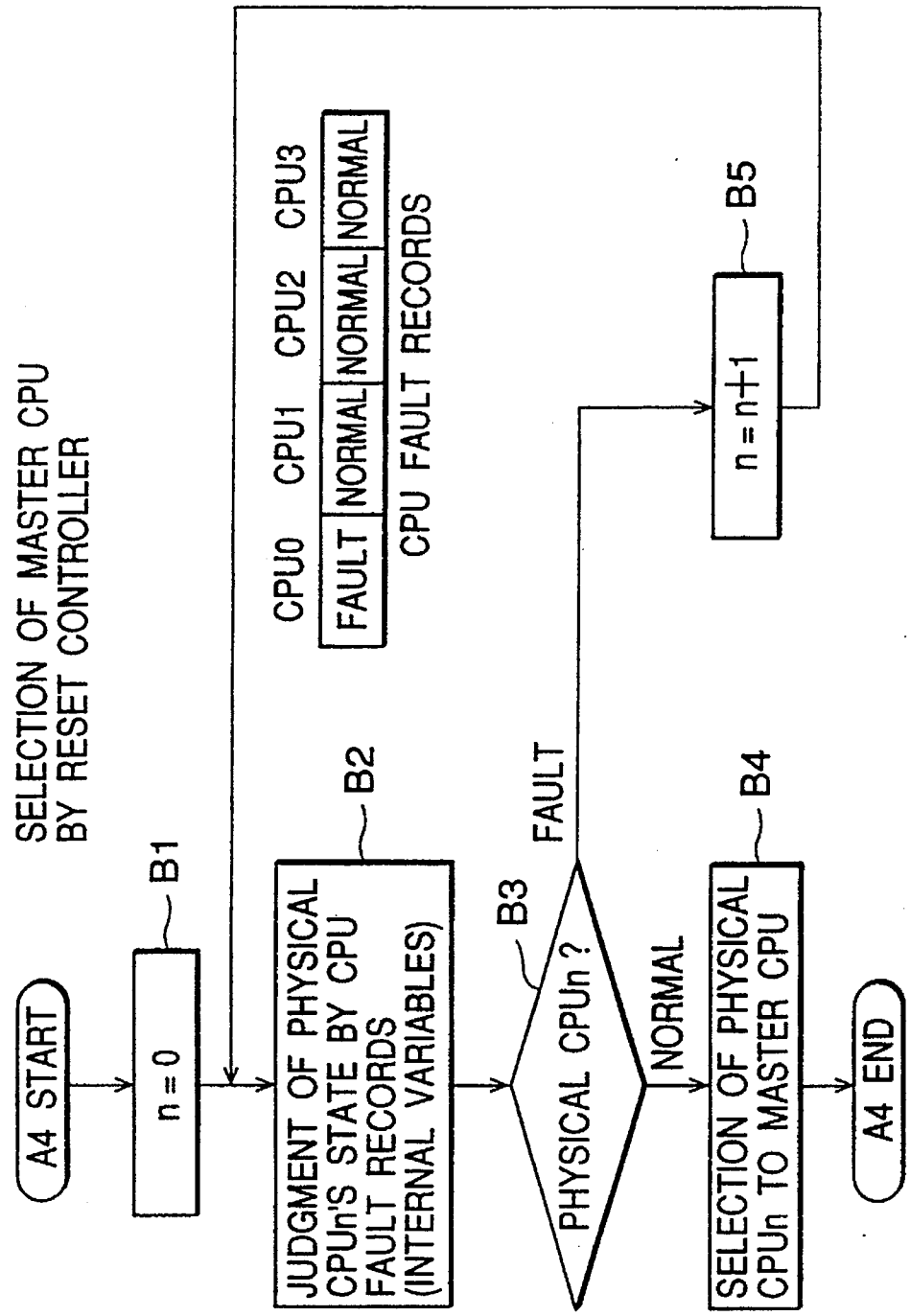
FIG. 8 is a flow chart showing a selecting processing of a master CPU conducted by a reset controller according to Example 1 of the invention.
Figure 9:
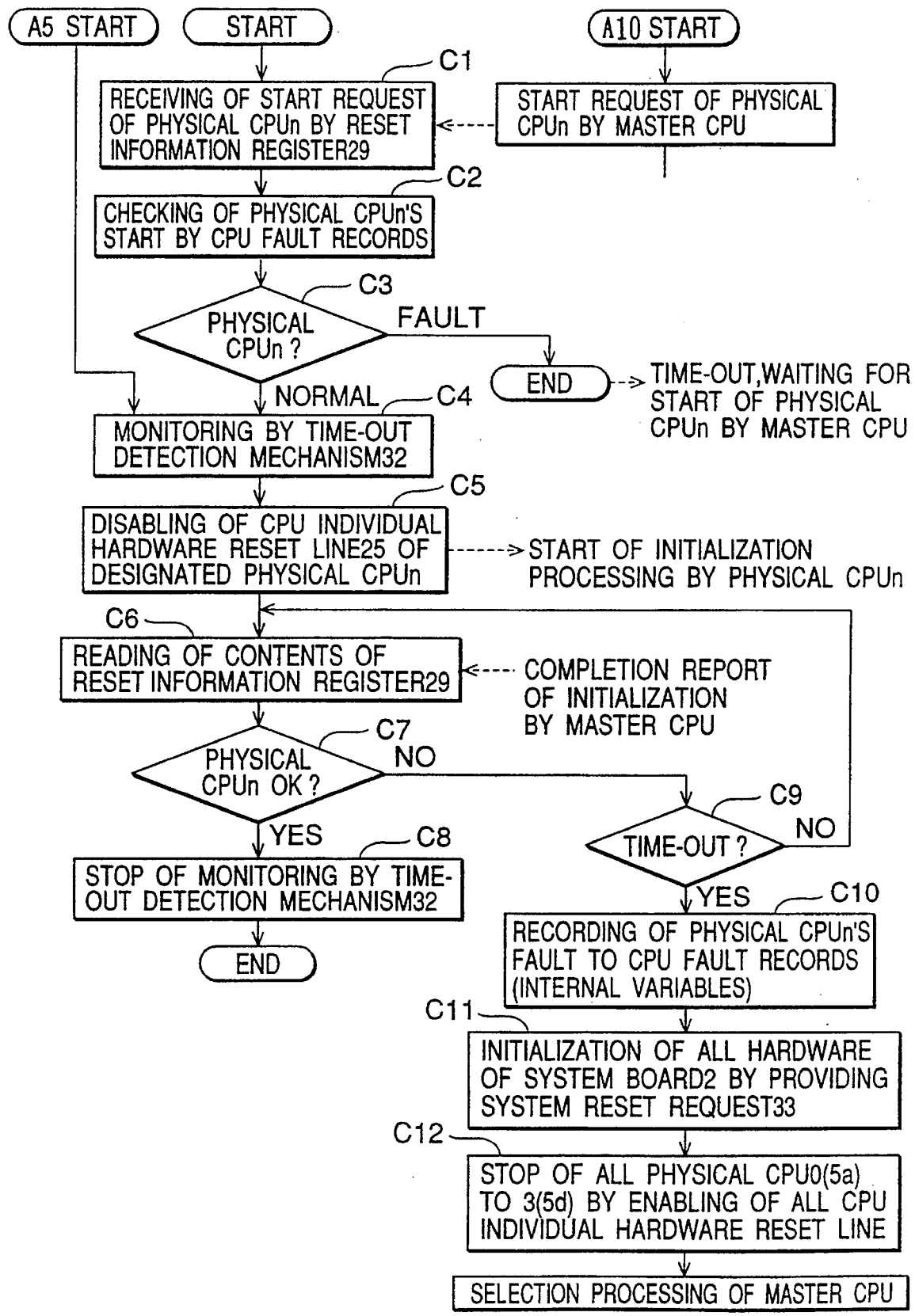
FIG. 9 is a flow chart showing a start of a physical CPU and a monitoring processing of time-out conducted by the reset controller according to Example 1 of the invention.
Figure 10:
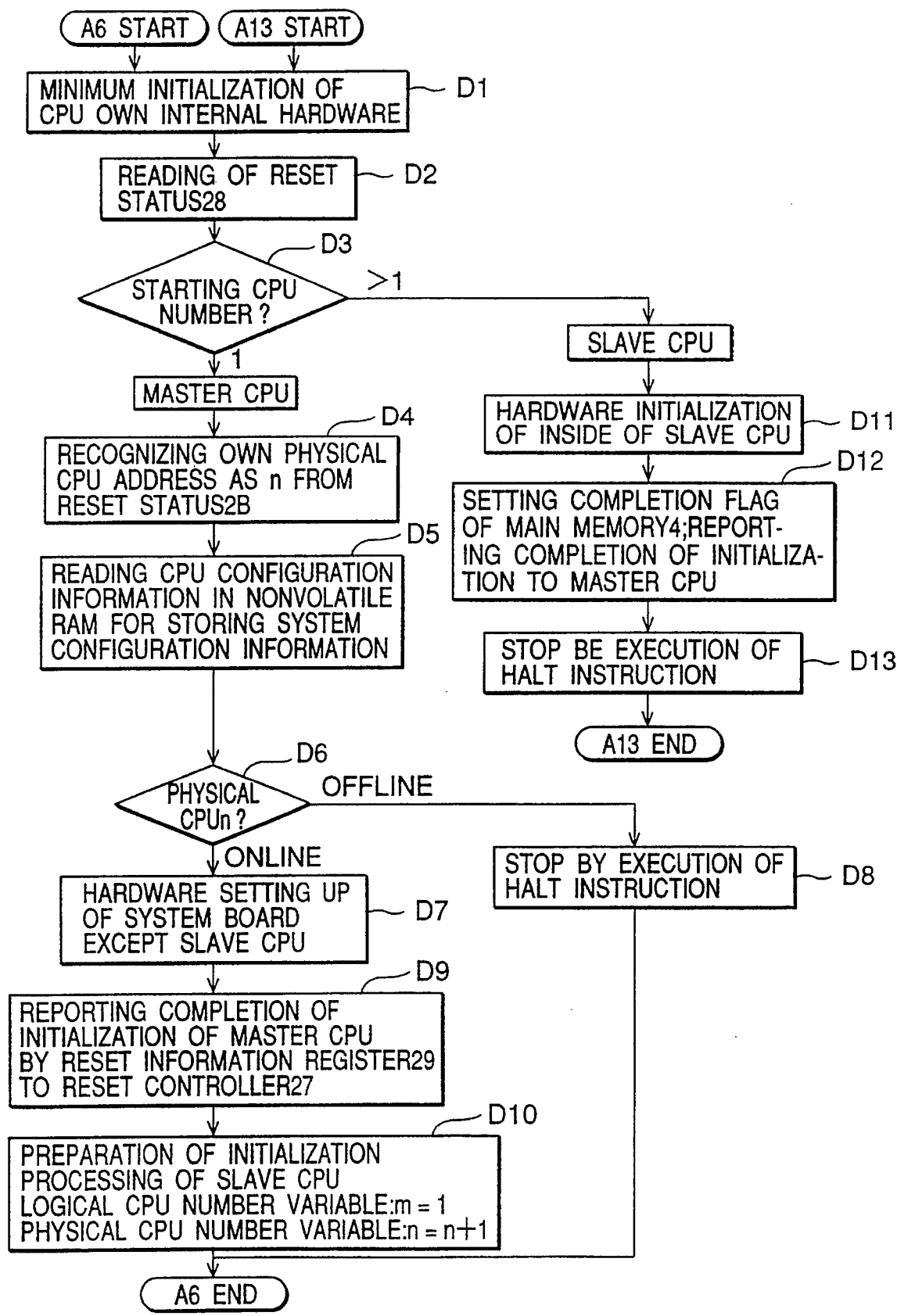
FIG. 10 is a flow chart showing a processing of initialization of physical CPU according to Example 1 of the invention.
Figure 11:
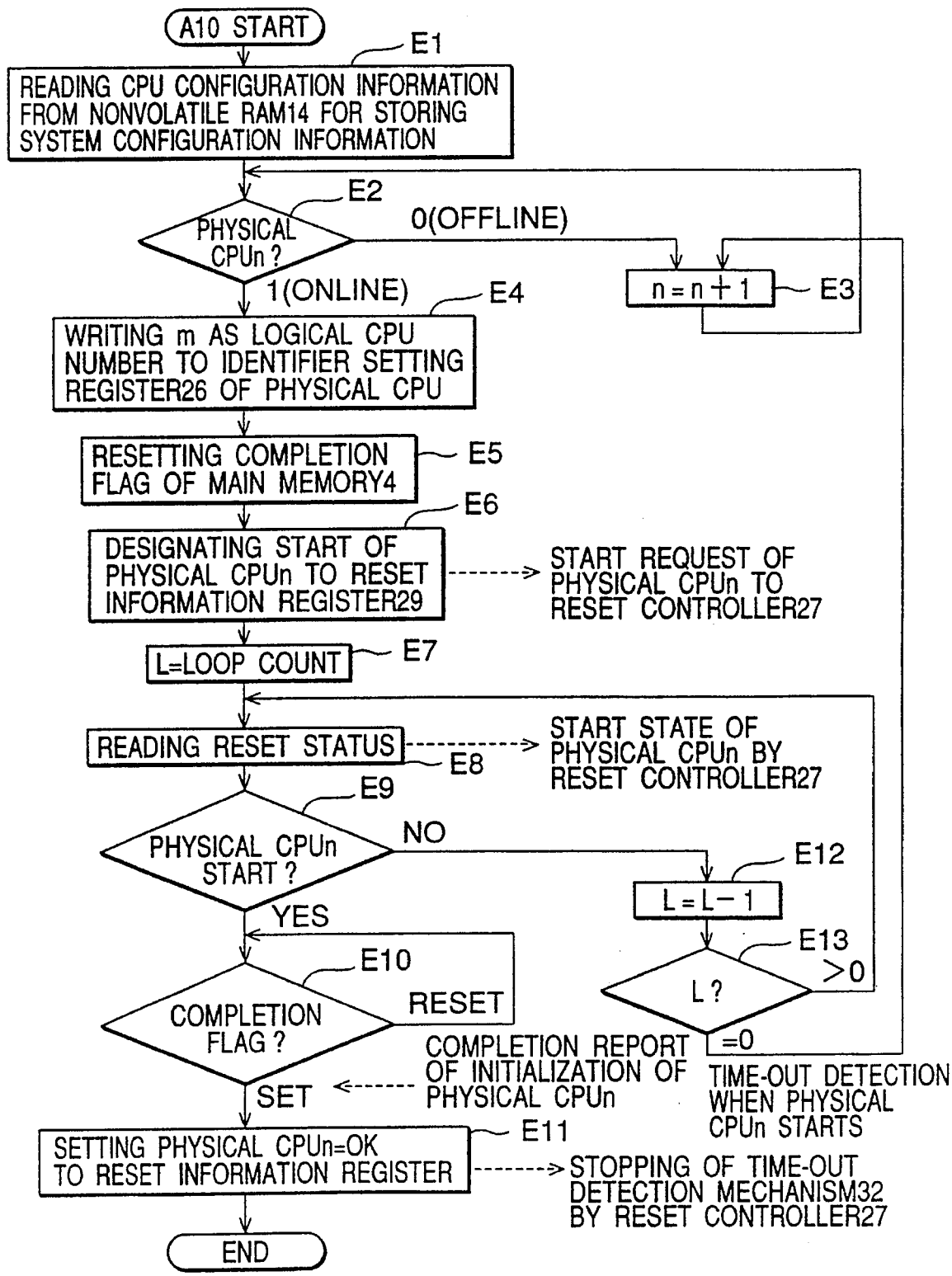
FIG. 11 is a flow chart showing sequential processings of selection, start, initialization of slave CPUs, conducted by the master CPU, according to Example 1 of the invention.

FIG. 7 is a flow chart showing the entire flow of the system initialization processing of Example 1; FIG. 8 is a flow chart showing selection processing of a master CPU conducted by the reset controller 27 and details of step 4A in FIG. 7. FIG. 9 is a flow chart showing sequential processing flows of start, monitoring of the time-out, and the processing of the time-out of the physical CPUs 5a to 5d conducted by the reset controller 27, and shows operation of the reset controller 27 corresponding to the, time-out processing of steps A5 to A7, A10 to A14, and A15 to A18 in FIG. 7. FIG. 10 is a flow chart showing initialization processing of the physical CPUs 5a to 5d, and shows the initialization processings of the master CPU and slave CPUs as a whole. Either CPU starts the processing from the same instruction address when started, and recognizes itself as either the master or the slave in accordance with the flow chart. FIG. 11 is a flow chart showing sequential processings of selection and start of the slave CPUs conducted by the master CPU and report of the completion of initialization processing of the slave CPUs given to the reset controller 27, and shows the processings of the master CPU corresponding to the steps A10 to A14 in FIG. 7.

Referring to the flow chart in FIG. 7, an operation, after the power is turned on, from the completion of initialization of the system board 2 to a start of loading of an initial program will be described. Upon the power on, the power is supplied to all the hardware of the system board 2 shown in FIG. 1 (step A1, equivalent to time t1 in FIG. 6). When the power is turned on, the power-on-reset generator 22 makes the power-on-reset signal line 23 enable as shown at time t2 in FIG. 6. By rendering the power-on-reset signal line 23 enable, all the hardware on the system board 2 is set to a minimum initial state at which the physical CPUs 5a to 5d are able to start the initialization processing (step A2).

At that time, all bit of the identifier setting register 26 shown in FIG. 3 is set to zero, thereby designating the logical CPU numbers of all the physical CPUs 5a to 5d to zero as the logical CPU number of the master CPU. In addition, all bit of the reset information register 29 shown in FIG. 4 is set to zero, thereby making all the start requests and reports of the completion of initialization processing of the physical CPUs 5a to 5d disable.

The reset controller 27 receives an enable signal of the power-on-reset signal line 23 at a reset input thereof, and makes all the CPU individual hardware reset lines 25a to 25d enable as shown by time t3 in FIG. 6. According to this, the physical CPUs 5a to 5d shown in FIG. 2 initialize the built-in processor 51, the interruption controller 52, the secondary cache 53, and the CPU controller 54, and are logically cut off from the CPU bus 3.

Furthermore, as shown by time t4 in FIG. 6, the bus request to the CPU bus 3 is made disable. As shown by time after time t4 in FIG. 6, the reset controller 27 holds the CPU individual hardware reset lines 25a to 25d at the enable level until that the physical CPU 5a to 5d to be started is determined, thereby logically cutting off the physical CPUs 5a to 5d from the CPU bus 3. As a result, if a CPU is not selected as a physical CPU to be started, the system sets up itself with a state in which the CPUs are degenerated. Then, as shown by time t7 in FIG. 6, the reset controller 27 starts initialization of internal states at a time that the power-on-reset signal line 23 is made disable. In particular, the CPU fault records of the physical CPUs 5a to 5d, as internal variables, are entirely set to "normal," and the reset controller 27 prepares for selection of the master CPU (step A3).

Then, the reset controller 27 determines the master CPU based on the CPU fault records in accordance with the following flow chart shown in FIG. 8. Although, at a time right after the power is turned on, since all the CPU fault records are set to "normal" at step A3, the physical CPU 5a assigned to the logical CPU number of zero is selected as the master CPU, after the initialization time-out processing of the master CPU which starts from step A15 as described below, since defective CPUs are set with "fault" record, a normal CPU is selected as the master CPU, and the system tries initialization of the master CPU again (step A4).

The reset controller 27 starts by rendering only the CPU individual hardware reset line 25 corresponding to the physical CPU selected to the master CPU at step A4 above, disable. In the example shown in FIG. 6, the reset controller 27 selects the physical CPU 5a as the master CPU, makes the CPU individual hardware reset line 25a disable at time t11, and monitors the processing time of initialization of the physical CPU 5a through the time-out detection mechanism 32. The processor 51 in the physical CPU 5a provides the bus request for reading out the first instruction of the initialization program from the predetermined instruction address in the ROM 13 for storing initialization program at time t13 in FIG. 6 (step A5).

At that time, regarding to the time chart in FIG. 6, the physical CPU 5a selected as the master CPU by the reset controller 27 recognizes itself as the master CPU in accordance with the flow chart shown in FIG. 10 described below, and executes setting-up of the hardware of the system board 2 after setting-up of the own internal hardware of the CPU. By the completion of the processing of this step A6, the main memory 4 and the peripheral equipment controllers 8 (general numeral of 8a to 8d) can be normally utilized. When the initialization processing is completed as normal, the master CPU 5a sets the information to the reset information register 29 and reports the completion of processing to the reset controller 27 through the reset information register 29, and upon it the reset controller 27 stops monitoring by the time-out detection mechanism 32 (step A6).

The reset controller 27 monitors the processing time of initialization of the master CPU by the time-out detection mechanism 32, and if the completion of processing is not reported within a predetermined time from the master CPU 5a through the reset information register 29, the reset controller 27 detects the time-out and starts the processing of the time-out (step A7). The master CPU 5a sequentially repeats the initialization processing as for the slave CPUs for the remaining physical CPUs 5b to 5d while one by one confirming the completion. Accordingly, if the initialization of the slave CPUs afterward is unsuccessful, it is easily judged which CPU forms the cause (step A8).

The master CPU 5a confirms the completion of initialization of all the slave CPUs, and is able to know how many slave CPUs are finally usable. The system then starts loading of initial programs from either the floppy disk unit 11 or the magnetic disk unit 12. The operating system is set up by that operation, and the information processing apparatus starts the system operation (step A9).

The master CPU 5a selects the physical CPUs at which the initialization processing is to be started as the slave CPUs, based on the CPU configuration information in the nonvolatile RAM 14 for storing system configuration information shown in FIG. 5, and determines the logical CPU number to set it to the identifier setting register 26. After a completion flag on the main memory 4 for receiving the report of the completion of initialization from the slave CPUs is reset, the master CPU 5a instructs the start of the physical CPU to the reset controller 27 by the reset information register 29 (step A10).

The reset controller 27, if instructed from the master CPU to start the physical CPU through the reset information register 29, checks the CPU fault information as an internal variable. If the physical CPU is turned out "fault," the reset controller 27 judges that the physical CPU cannot start, and stops the start of the physical CPU conducted by rendering the CPU individual hardware reset line 25 disable. On the other hand, after instructing start of the physical CPU by the reset information register 29, the master CPU monitors the status of the CPU individual hardware reset lines 25 corresponding to the physical CPUs selected from the reset status input port 28, and if it does not become disable within a predetermined time, the master CPU judges that the physical CPU was "fault" and moves to the initialization processing of the next physical CPU (step A11).

The reset controller 27 judges that the physical CPUs which have received the start instruction from the master CPU are able to start, and gives start to the physical CPUs by rendering the corresponding CPU individual hardware reset lines 25 disable. Moreover, the reset controller 27 monitors the initialization processing of the slave CPUs by the time-out detection mechanism 32 (step A12).

The slave CPUs recognize themselves as the slave CPUs in accordance with the flow chart on FIG. 10, execute initialization processing for slave CPU, and report the completion to the master CPU by setting the completion flag on the main memory 4. The master CPU which has received the report then reports the completion of initialization of the physical CPU to the reset controller 27 by the reset information register 29, and the reset controller 27 stops monitoring by the time-out detection mechanism 32 (step A13).

The reset controller 27 monitors the processing time of initialization of the slave CPUs by the time-out detection mechanism 32, and if the completion of processing is not reported within a predetermined time through the reset information register 29 from the master CPU 5a which has received the completion report of initialization of the slave CPUs, the reset controller 27 detects the time-out and starts the processing of the time-out (step A14).

The reset controller 27 which has detected the time-out, records "fault" to the CPU fault records as of the internal variable of the physical CPU which has started just before (step A15). The reset controller 27, by rendering the system reset request line 33 enable, makes the system reset signal line 35 enable thereby making all the hardware reset inputs of the system board 2 enable. If the time-out occurs, all system except the reset controller 27 is in a situation that an ordinary operation cannot be expected, because it is assumed that either the CPU bus 3 or the local bus 7 has been occupied with defective CPU or whatever. Accordingly, all the hardware is required to initialize at one time upon that the reset controller 27 provides the system reset request (step A16). All the hardware of the system board 2 is reset to the initial state immediately after the power-on-reset (step A17).

The reset controller 27 initializes all the physical CPUs 5a to 5d by rendering all the CPU individual hardware reset lines 25a to 25d enable, and logically cuts off them from the CPU bus 3. After the completion of the processing above, the reset controller 27 retries the selection processing of the master CPU at step A4. The processing above is similarly executed during the initialization process of the slave CPUs, so that, even if the slave CPUs having fault occupies the CPU bus 3, the processing of setting-up can be retried by releasing the occupied state (step A18).

Referring to the flow charts shown in FIGS. 8 to 11, details of main processing of the fundamental processing for system initialization shown in FIG. 7 will be described. FIG. 8 is a flow chart showing the selection processing of the master CPU by the reset controller 27 corresponding to step A4 in FIG. 7. Here, the reset controller 27 selects a master CPU based on the CPU fault records as internal variables. The CPU fault records are set to all "normal" at step A3 in FIG. 7, and records the corresponding physical CPUs as "fault" at a time of the time-out detection. The reset controller 27 can get rid of the defective CPUs from the selection of the master CPU at a time of retry by use of the variables.

The reset controller 27 initializes the pointer n of the CPU fault records to zero as in FIG. 8 (step B1), and checks the status in the CPU fault records of the physical CPUn whose logical CPU number is n (step B2). If the physical CPUn is in a fault state, the pointer n is proceeded to check the status of next physical CPU (step B3, B5, B2). In contrast, if the physical CPUn is confirmed as "normal" at step B3, the physical CPU is selected to the master CPU, and the system ends the processing (step B4).

FIG. 9 is a flow chart showing sequential processings of start and the time-out processing of the physical CPUs by the reset controller 27. Although the commencement of the processing is corresponding to either step A5 or step A10 in FIG. 7, FIG. 9 shows sequential processings of the reset controller 27 in which the step is the start point. First, the reset controller 27 receives the start request of the physical CPUn from the master CPU through the reset information register 29 (step C1), and checks by the CPU fault records whether the physical CPUn is "normal" or "fault" (step C2). If the physical CPUn is "fault," the physical CPUn will not be started, and the processing is ended.

At that time, after transmission of the start request by the reset information register 29, the master CPU monitors disabling of the CPU individual hardware reset lines 25 of the physical CPUn through the reset status input port 28, and recognizes the physical CPUn as "fault" by detecting the time-out. The reset controller 27, by the processing above, maintains the CPU individual hardware reset lines corresponding to the defective CPUs to be enable, and logically cuts off the defective CPUs from the CPU bus 3 (step C3).

If the physical CPUn is "normal," the reset controller 27 starts monitoring the initialization processing of the physical CPUs by the time-out detection mechanism 32. In the case of the master CPU's start corresponding to step A5 in FIG. 7, the processing starts from this step (step C4). The CPU is started by rendering the CPU individual hardware reset lines 25 of the physical CPUn disable. The physical CPUn starts the initialization processing from a predetermined instruction address, and reads the completion report of initialization of the physical CPUn from the reset information register 29. The completion report is performed by the master CPU in the case of the initialization of either the master CPU or the slave CPU (step C6). The reset controller 27 judges whether the completion report of initialization of the physical CPUn exists, from the data read through the reset information register 29 (step C7). While confirming the completion report of initialization of the physical CPUn, the reset controller 27 stops monitoring by the time-out detection mechanism 32. Then, the reset controller 27 waits for start request of the next slave CPU from the master CPU (step C8).

If the completion report of initialization of the physical CPUn is not provided, the time-out is checked at the time-out detection mechanism 32. If the time-out is detected, the time-out processing as step C10 and below is started, and if the time-out is not yet detected, the processing repeats steps C6, C7 until that the completion report is received (step C9). That is, the reset controller 27 records the physical CPUn as "fault" at the CPU fault records, and then, implements the equivalent processing as step A15 in FIG. 7 (step C10). Then, all the hardware on the system board 2 except the reset controller 27 is initialized by rendering the system reset request line 33 enable (step C11). All the physical CPUs 5a to 5d are initialized by rendering the CPU individual hardware reset lines 25a to 25d enable, and are logically cut off from the CPU bus 3. The reset controller 27 then implements again from the selection processing of the master CPU at step A4 in FIG. 7 (step C12).

FIG. 10 is a flow chart showing an initialization processing of the physical CPUs 5a to 5d. This program is stored in the ROM 13 for storing initialization program, and is executed from a predetermined instruction address by rendering the CPU individual hardware reset lines 25 feeding to the physical CPUs 5a to 5b disable. Accordingly, the processing will be started from the same step in both cases of the master CPU and the slave CPUs and then separated in a midway to the processing for the master CPU and for the slave CPUs, based on the information from the reset status input port 28.

At this stage, the system has not yet set up completely, and since it may be anticipated that the main memory 4 cannot be used, a minimum hardware in the own CPU is initialized to enable the system to implement the following processing (step D1). Next, the status of the CPU individual hardware reset lines 25 is read from the reset status input port 28 (step D2). According to the status of disabling of the CPU individual hardware reset lines 25, if only one line (or one bit) is made disable, it is judged as the master CPU, and if two or more lines (two or more bits) are made disable, it is judged as the slave CPU (step D3).

If it is the master CPU, the physical CPU recognizes that its own physical CPU number is n from the bit position of the CPU individual hardware reset lines 25 in which only one bit is disable according to the reset status input port 28 monitoring the CPU individual hardware reset lines 25 (step D4), and then, reads the CPU configuration information from the nonvolatile RAM 14 for storing system configuration information to check its own status. At that time, the physical CPU may be cut off from the system by designating oil-line onto the CPU configuration information while mounted, by the reason such that the operation is unstable (step D5).

The system judges the status of the physical CPU from the CPU configuration information (step D6), and if recognizing as on-line, the system implements setting-up of all the hardware except the slave CPUs. By this operation, the main memory 4, the peripheral equipment controller 8 and the like become available (step D7). If recognizing as off-line, the system executes HALT instruction and ceases. As a result, the reset controller 27 detects the time-out, and keeps out the physical CPUn from the following processing of setting-up. The reset controller 27 initializes all the system once, and then starts the processing of setting-up again from the selection of the master CPU (step D8).

After step D7, the reset information register 29 reports the completion of initialization of the master CPU to the reset controller 27. The reset controller 27 stops monitoring the time-out by the time-out detection mechanism 32 upon receiving of the report (step D9). In order to start the processing of initialization of the slave CPUs, a value 1, as internal variable, is stored at the logical CPU number variable m, and a physical CPU number next to the physical CPU number of its own CPU recognized at step D4 is stored at the physical CPU number variable n. This operation allows the system to prepare so that the logical CPU number m which starts from one is assigned sequentially from the physical CPU having a physical CPU number next to one of its own CPU (step D10).

On the other hand, if recognizing itself as the slave CPU, the physical CPU initializes only the hardware in its own CPU (step D11), sets the completion flag on the main memory 4, and reports the completion of initialization to the master CPU (step D12). Then, the CPU executes HALT instruction, and thereby stops. After loading of the initial program by the master CPU is completed, the operating system will restart by communications between CPUs (step D13).

FIG. 11 is a flow chart showing sequential processings of selection, start, and initialization processing of a slave CPU conducted by a master CPU. Although the start of this processing is corresponding to step A10 in FIG. 7, the following shows the master CPU's sequential processings up to the completion report of initialization of the slave CPU, and the detailed processings implemented by the master CPU are shown in steps from A10 to A14 in FIG. 7. Here, a relation with the processing conducted by the reset controller 27 in FIG. 9 will be also described.

The CPU configuration information shown in FIG. 5 is read from the nonvolatile RAM for storing system configuration information which is connected to the local bus 7 (step E1). The status of the physical CPUn is judged from the CPU configuration information. At this step, n is set to a number next to the physical CPU number of the master CPU at a time of the initialization processing of the master CPU, and is added by one at every completion of setting-up of the slave CPU (step E2). If the physical CPUn is off-line, n is added by one to check the next physical CPU because initialization processing is impossible. Therefore, the reset controller 27 maintains the CPU individual hardware reset lines 25 to the physical CPUs at which the off-line is designated, to be enable, thereby logically cutting off the physical CPUs from the CPU bus 3 (step E3).

If the physical CPUn is on-line, the master CPU starts preparation of initialization processing as of the slave CPUs. First, m is set to the identifier setting register 26 corresponding to the physical CPUn as the logical CPU number. Since the identifier setting register 26 is constituted as shown in FIG. 3, a value is easily set to a portion corresponding to the physical CPUn by writing request of a bite unit designating m (step E4). A completion flag is set on the main memory 4 to report the completion of initialization processing of the slave CPU, and is reset (step E5). Then, the reset information register 29 instructs the start of the physical CPUs to the reset controller 27. This timing is corresponding to step C1 in FIG. 9 (step E6).

To monitor the start of the physical CPUn by the reset controller 27, a loop count is set to the internal variable L (step E7). The status of the CPU individual hardware reset lines 25 is read from the reset status input port 28 (step E8), and it is judged from the status of the CPU individual hardware reset lines 25 whether the physical CPUn is started. If the physical CPUn is started, the CPU individual hardware reset lines 25 corresponding to the physical CPUn is made disable by the reset controller 27 (step E9). After the CPU individual hardware reset lines 25 corresponding to the physical CPUn is made disable and after the start of the physical CPUn is confirmed, the master CPU waits for setting of the completion flag on the main memory 4.

Although if the initialization of the physical CPUn is unsuccessful the master CPU hangs on as it is, since the reset controller 27 detects the time-out by the time-out detection mechanism 32 and starts the time-out processing thereby resetting all the hardware at one time, the master CPU is able to escape from the hanging state at that time. Inversely, since this system has the common bus configuration, if the initialization of the physical CPUn is unsuccessful, the following processing by the CPU bus 3 is not guaranteed, so that even if the master CPU monitors the time-out at this stage the following processing conducted by the master CPU may not be continued. This timing is corresponding to step C5 in FIG. 9 (step E10).

Upon receiving of the completion report of initialization processing of the physical CPUn, the reset information register 29 reports the completion of processing to the reset controller 27. The reset controller 27 stops monitoring by the time-out detection mechanism 32 upon receiving of this report. This processing is corresponding to steps C6 to C8 in FIG. 9 (step E11).

At step E9, if the physical CPUn does not start, the loop count stored in L is reduced by one (step E12), and the loop count stored in L is judged. If the loop count is zero, it is judged as the time-out, and it is assumed that the reset controller 27 has judged that the physical CPUn is "fault." This timing is corresponding to step C3 in FIG. 9. As a result, the process will return to step E3 to judge whether a CPU corresponding to a physical CPU number next to one of the physical CPUn can start. On the other hand, if it is not the time-out, the process will repeat steps E8, E9 (step E13).

According to the processings described above, setting-up of the system can be completed only by normal CPUs while the defective CPUs are logically cut off from the CPU bus 3 as the CPU individual hardware reset lines 25 of the defective CPUs are maintained to be enable. The CPU numbers of the normal CPU can be defined continuously from zero. It is to be noted that although the number the CPUs is four in Example 1, the same effect can be obtained where the number of the CPUs is four or more.

The effects of Example 1 are as follows:

(1) According to Example 1, the identifier setting register 26 designates the CPU numbers to only normal CPUs in a predetermined order; the reset controller 27 logically cuts off the defective CPUs from the common bus, detecting the defective CPUs during setting-up processing based on the time-out detection, beginning re-setting up automatically, and releasing an abnormal state of the hardware at the time of time-out of setting-up processing; an arbitrary CPU, as a center of control, can control the setting-up processing based on the contents of the reset status input port 28 and the reset information register 26. Therefore, the system according to Example 1 has effects in which: even if the arbitrary CPU is defective, the system maintains compatibility with the existing software by automatically setting the predetermined CPU numbers to the remaining normal CPUs; the system surely carries out an automatic operation because the defective CPUs are cut off from the system so that the system automatically starts degenerate operation; the system requires little addition of the hardware since the setting-up processing can be controlled by a CPU as a center, thereby enabling itself to start the system operation with a low cost system configuration.

(2) Since the identifier setting register 26 sets the CPU number of the master CPU to all the register in response to the system reset signal, an arbitrary CPU can be readily selected to the master CPU, and since a value from the common bus can be set only when the CPU individual hardware reset lines 25 are enable, the system can be constituted of a minimum hardware, and the value is easily set.

(3) Since the CPUs are logically cut off by holding the CPU individual hardware reset lines 25 to be enable, a system which uses general purpose LSIs can easily use this system.

(4) The reset controller 27 monitors setting-up processings of the CPUs through the time-out detection mechanism 32, and when the time-out is detected, the CPUs are not used for the following setting-up processing. Therefore, the CPUs at which setting-up fault occurs are temporarily cut off from the system, thereby cutting off the defective CPUs from the system so that the system automatically starts degenerate operation, so that the system surely carries out an automatic operation.

(5) Since all the CPUs start from the specific address by rendering the CPU individual hardware reset lines 25 disable, all the CPUs can be set up by a single ROM 13 for storing initialization program, so that the system will be constituted inexpensively.

(6) Since the reset controller 27 monitors setting-up of the master CPU and conducts re-setting up after the system is reset during the detection of the time-out, the system is able to release an abnormal state of the hardware at the time of time-out of setting-up processing, to elevate certainty of success of re-setting up, and to identify the defective CPUs readily.

(7) The CPU recognizes itself as a master CPU because the CPU individual hardware reset lines 25 is made disable at only one bit, and the CPU is able to know its own physical CPU number. Therefore, the master CPU is smoothly set up, and the system is inexpensively accomplished with less amount of its hardware.

(8) The master CPU selects CPUs to be initialized as slave CPUs based on the CPU configuration information of the nonvolatile RAM 14, determines the CPU numbers to set at the identifier setting register 26, and proceeds the setting-up processing of the slave CPUs while confirming each completion of setting-up, so that the system can easily identify the defective CPU with less amount of its hardware.

(9) When the reset controller 27 detects the time-out of setting-up of the slave CPUs, the system retries from the setting-up processing of the master CPU after the system is reset. Therefore, An abnormal state of the hardware at a time of the time-out occurrence can be released, and the system can improve the certainty of success of re-setting up.

(10) The slave CPU recognizes itself as the slave CPU by two or more bits of the disabled CPU individual hardware reset lines 25. Therefore, the slave CPU can be set up smoothly and with less amount with less of its hardware.

EXAMPLE 2

Figure 12:
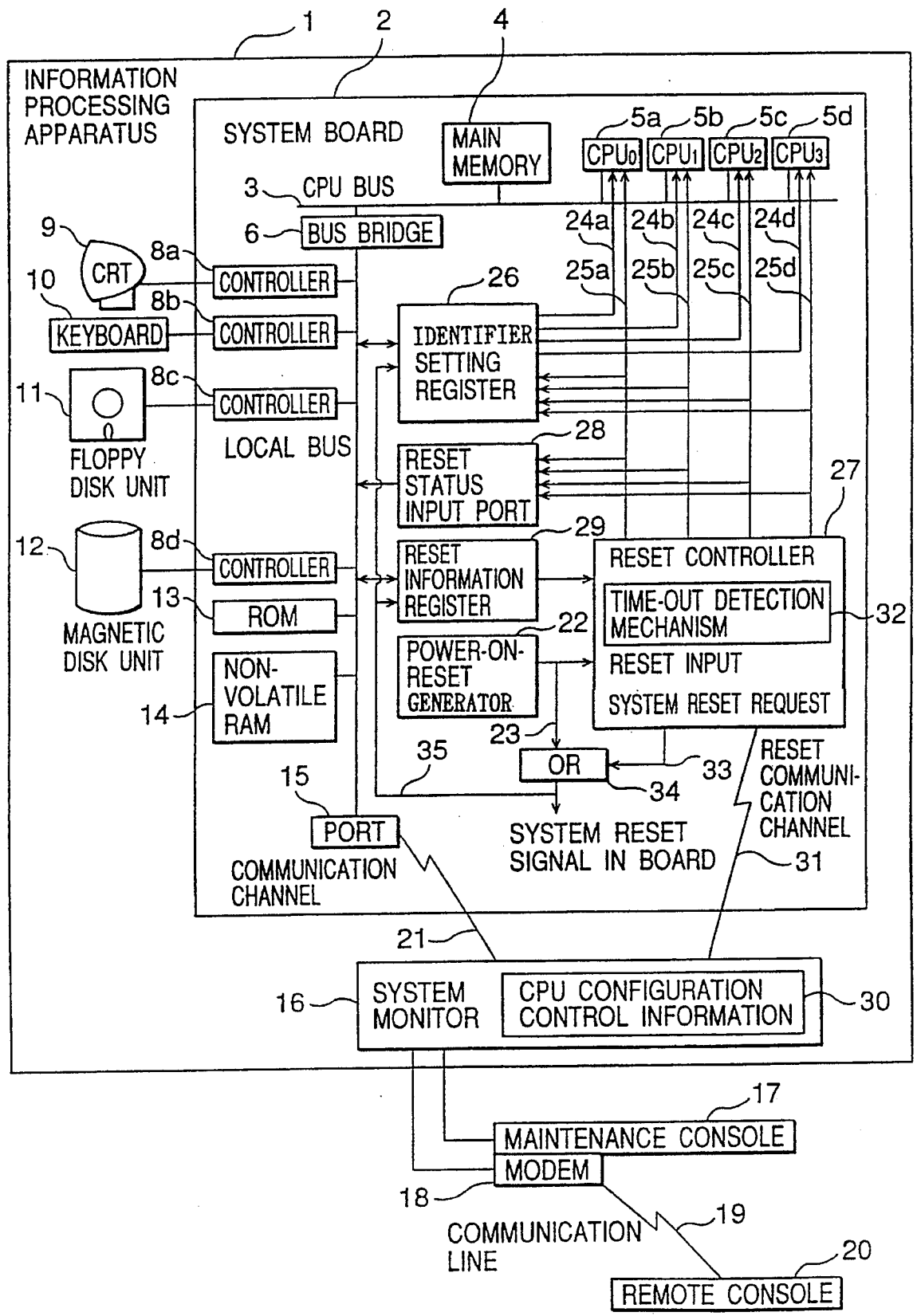
FIG. 12 is a block diagram showing an information processing apparatus as a symmetric multiprocessor system according to Example 2 of the invention.

FIG. 12 is a block diagram showing an information processing apparatus as a symmetric multiprocessor system according to Example 2 of the invention. In FIG. 12, the same portions as those of Example 1 shown in FIG. 1 have the same numerals, and those descriptions are omitted for the sake of simplicity. As new numerals: numeral 15 is an input/output port arranged at the end of the local bus 7, connecting the communication channel; numeral 16 is a system monitor for monitoring abnormal circumstances of the system, operated by a power supply separated from that for the system board 2; numeral 17 is a maintenance console; numeral 18 is a modem; numeral 19 is a communication line; numeral 20 is a remote console; numeral 21 is a communication channel for data communication between the physical CPUs 5a to 5d and the system monitor 16, and is used for system monitoring software or the like which is executed at the physical CPUs 5a to 5d as to obtain system status information from the system monitor 16. Numeral 30 is CPU configuration control information for retaining fault information of the physical CPUs 5a to 5d; numeral 31 is a reset communication channel for data communication between the reset controller 27 and the system monitor 16. The communication channel 21 is used for the physical CPUs 5a to 5d during the operation of system, and is used only when the system is operating normally. In contrast, the reset communication channel 31 is used for reading and writing of the CPU configuration control information 30 between the reset controller 27 and the system monitor 16 during system as setting-up processing, and is used notwithstanding the operation state of the system.

That is, by adding the CPU configuration control information 30 in the system monitor 16 in regard to Example 1 shown in FIG. 1, the information processing apparatus according to Example 2 shown in FIG. 12 is able to retain, after turning off of the power of the system board 2, the records of the physical CPU at which a fault occurs when the system is set up, and to utilize them again at the following setting-up. The information processing apparatus further enables the fault information to be read from the maintenance console 17 and the remote console 20, and the system can be set up without an arbitrary physical CPU by designating the defective CPU from the maintenance console 17 and the remote console 20 to the CPU configuration control information 30.

Figure 13:
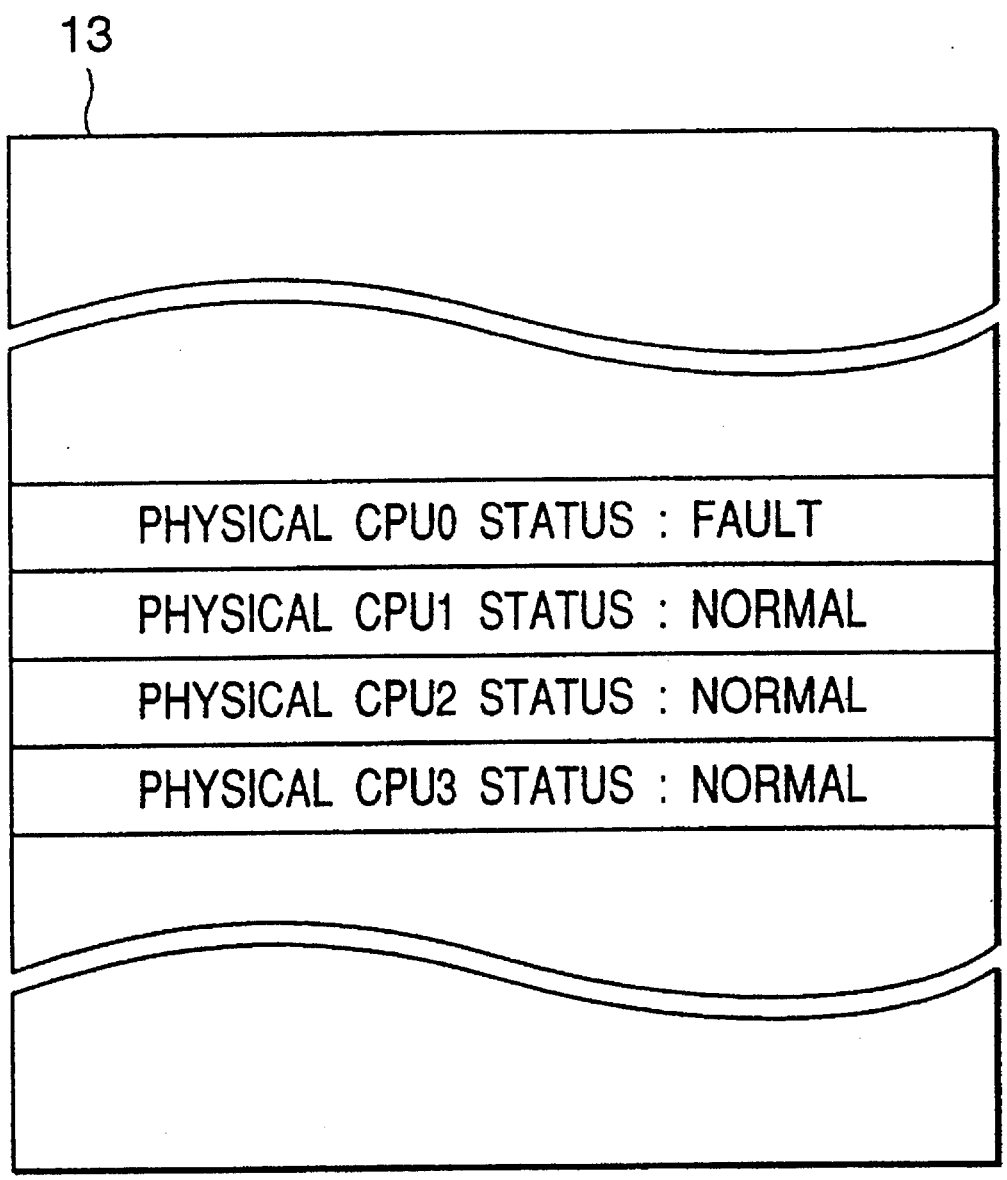
FIG. 13 is a schematic diagram illustrating CPU fault information in CPU configuration control information according to Example 2 of the invention.

FIG. 13 is a diagram showing a portion concerning the CPU fault information among the CPU configuration control information retained by the system monitor 16. The data indicate the fault states of the corresponding physical CPUs, and in this example, it is recorded that only the physical CPU 5a whose logical CPU number is zero is fault. Those data are read at the time of initialization of the physical CPUs 5a to 5d by the reset controller 27 and are used for logically cutting off the physical CPUs in a fault state from the CPU bus 3. If any defective CPU is found during the initialization processing, the reset controller 27 records the data corresponding to the defective CPU as fault. Therefore, this fault information is very useful for setting-up of the system at a time after the power supply to the system board 2 is stopped, and since the defective CPUs are identified at any time from the remote console 20 notwithstanding of the power-on and off of the system board 2, the system can reduce the time for the following setting-up and improve a task of its maintenance. By previously recording the data corresponding to unstable physical CPUs 5a to 5d as fault, such CPUs can be temporarily cut off from the system, so that the system can improve its reliance.

Figure 14:
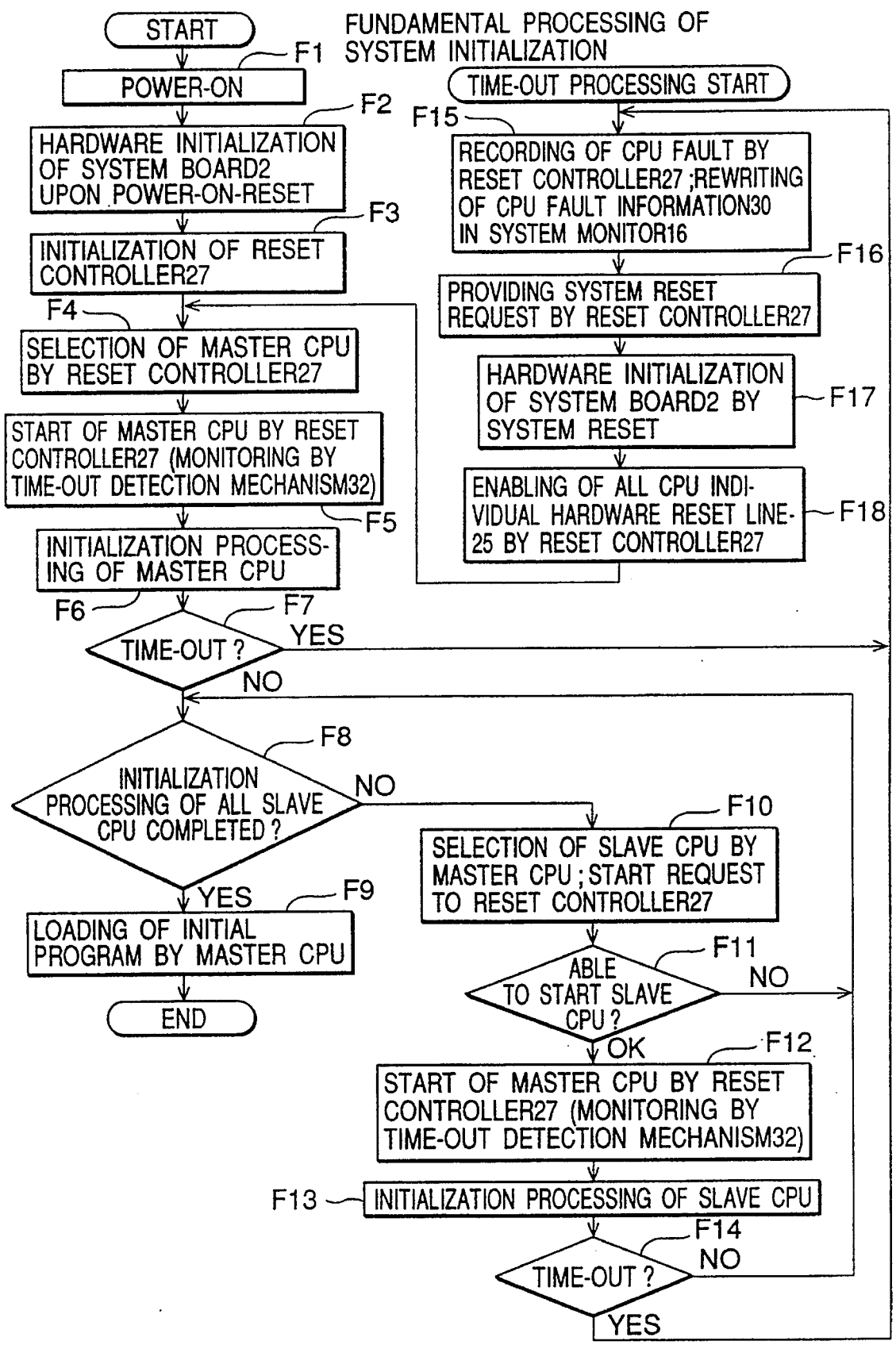
FIG. 14 is a flow chart showing the entire flow of the processing of the initialization of system according to Example 2 of the invention.
Figure 15:
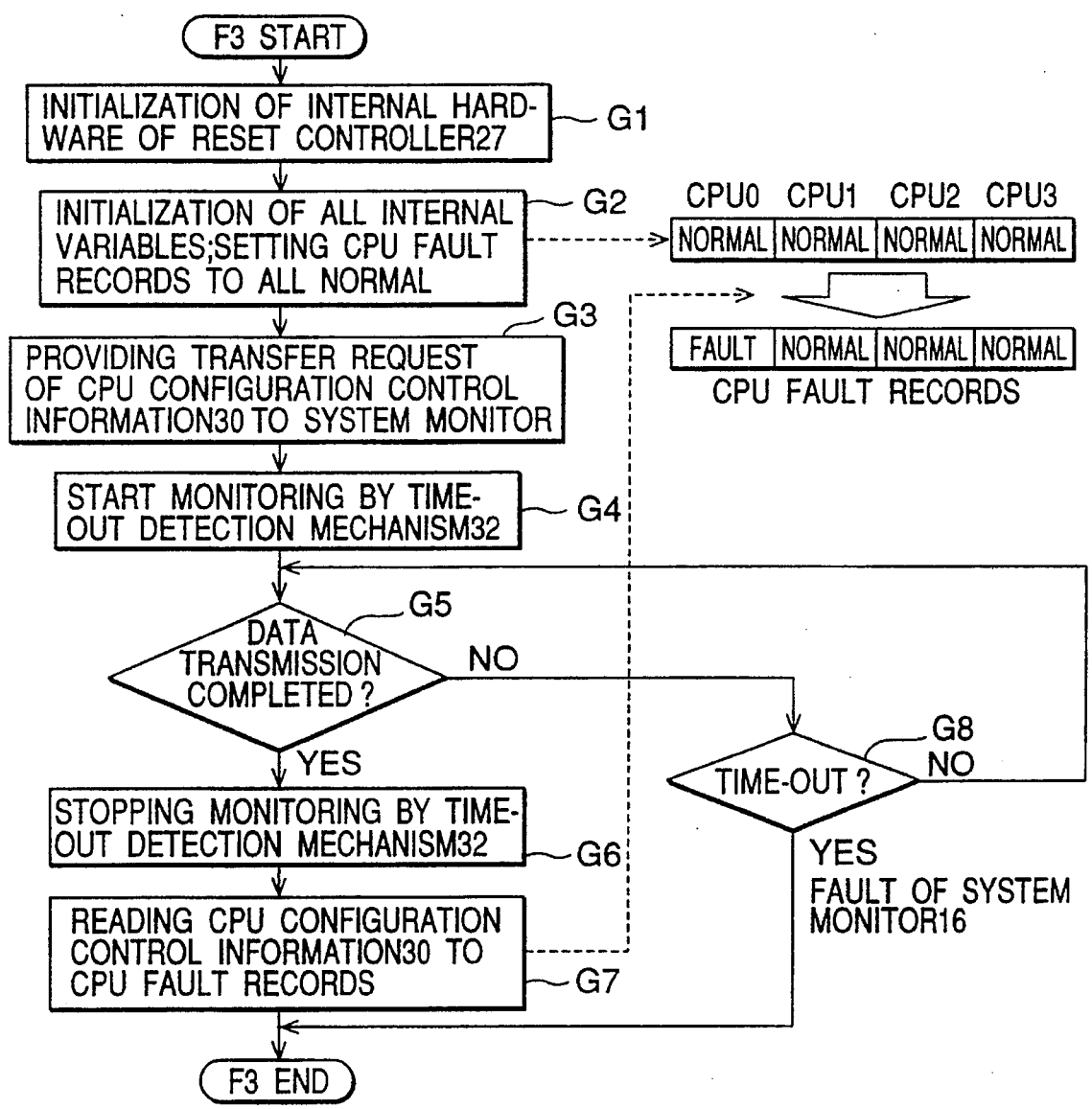
FIG. 15 is a flow chart showing an internal initialization processing of the reset controller and a reading processing of the CPU configuration control information according to Example 2 of the invention.

Hereinafter, referring to flow charts in FIGS. 14, 15, operation of the information processing apparatus according to Example 2 will be described. FIG. 14 is a flow chart showing the entire flow of a system initialization processing of Example 2, and FIG. 15 is a flow chart describing the details of initialization of the reset controller 27 at step F3 in FIG. 14.

After the power is turned on, the operation up to loading of the initial program after completion of system initialization is almost the same as the operation of the flow chart of the fundamental processing of system initialization shown in FIG. 7 according to Example 1, and only the different processings from the flow chart in FIG. 7 are step F3 and step F15. That is, steps F1, F2 are almost the same as steps A1, A2 shown in FIG. 7. Upon turning the power on, the power is supplied to all the hardware of the system board 2 shown in FIG. 12 (step F1). When the power is turned on, the power-on-reset generator 22 makes the power-on-reset signal line 23 enable. By rendering the power-on-reset signal line 23 enable, all the hardware on the system board 2 is set to a minimum initial state at which the physical CPUs 5a to 5d are able to start the initialization processing (step F2).

At that time, all bit of the identifier setting register 26 is set to zero, thereby designating the logical CPU numbers of all the physical CPUs 5a to 5d to zero as the logical CPU number of the master CPU. In addition, all bit of the reset information register 29 is set to zero, thereby making all the start requests and the completion reports of initialization processing of the physical CPUs 5a to 5d disable. The reset controller 27 receives an enable signal of the power-on-reset signal line 23 at a reset input thereof, and makes all the CPU individual hardware reset lines 25a to 25d enable. According to this operation, the physical CPUs 5a to 5d are initialized and logically cut off from the CPU bus 3.

Furthermore, the bus request to the CPU bus 3 is made disable. The reset controller 27 holds the CPU individual hardware reset lines 25a to 25d at the enable level until that the physical CPU 5a to 5d to be started is determined, thereby logically cutting off the physical CPUs 5a to 5d from the CPU bus 3. As a result, if a CPU is not selected as a physical CPU to be started, the system sets up itself with a state in which the CPUs are degenerated.

Then, the reset controller 27 starts initialization of internal states at a time that the power-on-reset signal line 23 is made disable. In regard to self-initialization of the reset controller 27 and to reading processing of the CPU configuration control information 30, the master CPU is selected based on only the CPU fault records as internal variables of the reset controller 27 in Example 1. However, in Example 2, the master CPU is selected after the CPU configuration control information 30 is transferred from the system monitor 16 to the CPU fault records. As a result, the defective CPUs can be, from the beginning, out of the selection of the master CPU in accordance with the CPU fault information designated in advance in the CPU configuration control information 30. If the CPU configuration control information 30 is not read for an fault of the system monitor 16, the master CPU is selected only based on the CPU fault records as well as Example 1.

Steps F4 to F14 are almost the same as steps A4 to A14 shown in FIG. 7. That is, the reset controller 27 starts by rendering only the CPU individual hardware reset line 25 corresponding to the physical CPU selected to the master CPU at step F4 above, disable. The reset controller 27 selects the physical CPU 5a as the master CPU, makes the CPU individual hardware reset line 25a disable, and monitors the processing time of initialization of the physical CPU 5a through the time-out detection mechanism 32. The processor 51 in the physical CPU 5a provides the bus request for reading out the first instruction of the initialization program from the predetermined instruction address in the ROM 13 for storing initialization program (steps F4, F5).

At that time, the physical CPU 5a selected as the master CPU by the reset controller 27 recognizes itself as the master CPU, and executes setting-up of the hardware of the system board 2 after setting-up of the own internal hardware of the CPU. By the completion of the processing of this step F6, the main memory 4 and the peripheral equipment controllers 8 (general numeral of 8a to 8d) can be normally utilized. When the initialization processing is completed as normal, the master CPU 5a reports the completion of processing to the reset controller 27 through the reset information register 29, and upon receiving of it the reset controller 27 stops monitoring by the time-out detection mechanism 32 (step F6).

The reset controller 27 monitors the processing time of initialization of the master CPU by the time-out detection mechanism 32, and if the completion of processing is not reported within a predetermined time from the master CPU 5a through the reset information register 29, the reset controller 27 detects the time-out and starts the processing of the time-out (step F7). The master CPU 5a sequentially repeats the initialization processing as the slave CPUs for the remaining physical CPUs 5b to 5d. Accordingly, if the initialization of the slave CPUs afterward is unsuccessful, it can be easily judged which CPU forms the cause (step F8).

The master CPU 5a confirms the completion of initialization of all the slave CPUs, and is able to know how many slave CPUs are finally usable. The system then starts loading of initial programs from either the floppy disk unit 11 or the magnetic disk unit 12. The operating system is set up by that operation, and the information processing apparatus 1 starts the system operation (step F9).

The master CPU 5a selects the physical CPUs at which the initialization processing is to be started as the slave CPUs, based on the CPU configuration information in the nonvolatile RAM 14 for storing system configuration information, and determines the logical CPU number to set it to the identifier setting register 26. After a completion flag on the main memory 4 for receiving the report of the completion of initialization from the slave CPUs is reset, the master CPU 5a instructs the start of the physical CPU to the reset controller 27 by the reset information register 29 (step F10).

The reset controller 27, if instructed from the master CPU to start the physical CPU through the reset information register 29, checks the CPU fault information as internal variables. If the physical CPU is turned out "fault," the reset controller 27 judges that the physical CPU can not start, and stops the start of the physical CPU conducted by rendering the CPU individual hardware reset line 25 disable. On the other hand, after instructing start of the physical CPU by the reset information register 29, the master CPU monitors the status of the CPU individual hardware reset lines 25 corresponding to the physical CPUs selected from the reset status input port 28, and if it does not become disable within a predetermined time, the master CPU judges that the physical CPU was "fault" and moves to the initialization processing of the next physical CPU (step F11).

The reset controller 27 judges that the physical CPUs which have received the start instruction from the master CPU are able to start, and gives start to the physical CPUs by rendering the corresponding CPU individual hardware reset lines 25 disable. Moreover, the reset controller 27 monitors the initialization processing of the slave CPUs by the time-out detection mechanism 32 (step F12).

The slave CPUs recognize themselves as the slave CPUs in accordance with the flow chart on FIG. 10, execute initialization processing for slave CPU, and report the completion to the master CPU by setting the completion flag on the main memory 4. The master CPU which has received the report then reports the completion of initialization of the physical CPU to the reset controller 27 by the reset information register 29, and the reset controller 27 stops monitoring by the time-out detection mechanism 32 (step F13), The reset controller 27 monitors the processing time of initialization of the slave CPUs by the time-out detection mechanism 32, and if the completion of processing is not reported within a predetermined time through the reset information register 29 from the master CPU 5a which has received the completion report of initialization of the slave CPUs, the reset controller 27 detects the time-out and starts the processing of the time-out (step F14).

When the reset controller 27 starts the time-out processing, the fault CPU is set at the CPU fault records, and the corrected CPU fault records are rewritten at the CPU configuration control information 30 in the system monitor 16. As a result, an operator can know the fault state of the physical CPUs 5a to 5d from the maintenance console 17 and the remote console 20 at an arbitrary time, thereby improving a task of its maintenance. In Example 1, when the power for the system board is turned off the CPU fault records are lost, and at a time of turning on at the next time the defective CPUs are processed to be cut off again from the beginning. In Example 2, to the contrary, since the CPU fault records are stored in the CPU configuration control information 30 in the system monitor 16, the defective CPUs detected previously can be set aside from the initialization processing in advance at a time of the next turning on, thereby shortening the setting-up processing time (step F15).

The reset controller 27, by rendering the system reset request line 33 enable and thereby rendering the system reset signal line 35 enable, makes all the hardware reset input of the system board 2 enable. If the time-out occurs, the system may be in a situation that an ordinary operation cannot be expected except at the reset controller 27, since the CPU bus 3 or the local bus 7 may be occupied for, such as, the defective CPUs. Accordingly, all the hardware initialization at one time will be required by providing the system reset request from the reset controller 27 (step F16). All the hardware of the system board 2 is reset to the initial state right after the power-on-reset (step F17).

The reset controller 27 initializes all the physical CPUs 5a to 5d by rendering all the CPU individual hardware reset lines 25a to 25d enable and logically cuts off them from the CPU bus 3. After completion of the processing, the reset controller 27 retries the processings from the selection processing of the master CPU of step A4 above. Such a processing is also conducted in a similar manner when the slave CPUs are initialized, so that even where the CPUs at which a fault occurs occupy the CPU bus 3, the system releases the occupied state and can retry the setting-up processing (step F18).

The details of step F3 in FIG. 14 will be described in accordance with a flow chart in FIG. 15. This processing is executed by the reset controller 27, and shows a process flow for producing the CPU fault records by the CPU configuration control information 30 in the system monitor 16. If the power-on-reset is made disable, the reset controller 27 executes internal hardware initialization (step G1). The reset controller 27 initializes variables used internally. In particular, the reset controller 27 sets all the physical CPUs 5a to 5d as "normal" in the CPU fault records (step G2). The reset controller 27 then provides a transfer request of the CPU configuration control information 30 to the system monitor via the reset communication channel 31 (step G3).

The reset controller 27 then monitors the response of the system monitor 16 through the time-out detection mechanism 32 (step G4), and reads the CPU configuration control information 30 transmitted from the system monitor 16 as to the CPU fault records. Here, it is exemplified that the physical CPU 0 (5a) is recorded as "fault" at the CPU configuration control information 30 (step G7).

If the data transmission is not yet completed, the time-out detection by the time-out detection mechanism 32 is checked. If it is not yet the time-out, the processing returns to step G5 and waits for data transmission. On the other hand, if it is the time-out, it is judged that a fault occurs at the system monitor 16, and the system abandons reading of the CPU configuration control information 30 and continues the processing while the current CPU fault records are used as they are. As a result, a physical CPU 5a whose logical CPU number is 0 is selected as the master CPU (step G8).

According to the processings above, the defective CPUs can be confirmed from the CPU configuration control information, and unstable CPUs can be cut oil from the system from a remote location by registering in advance fault information to the CPU configuration control information. Although the number of CPUs is four in Example 2, it can be four or more.

The effects of the system according to Example 2 are as follows:

(1) In contrast to the constitution of Example 1, the system of Example 2 further includes the system monitor 16 having the CPU configuration control information 30 to retain fault information of the CPUs and being connected to the reset controller 27 through the reset communication channel 31 for transmitting data. Therefore, the records of the CPUs at which a fault occurs can be maintained in the CPU configuration control information 30 after the power of the system board 2 is turned off, so that the records of the defective CPUs can be used commonly at the following setting-up after the power is turned off, so that the system can confirm the defective CPUs at an arbitrary time, and so that the system would be set up with a shortened time at the following cycle and improves a task of its maintenance.

(2) Regarding to the description above, the reset controller 27 cuts off the defective CPUs from the system based on the contents in the CPU configuration control information 30 in the system monitor 16, thereby enabling the system to be cut off from unstable CPUs by designating them previously, and thereby improving the system's maintenance task and applicability of its usage.

(3) Regarding to the description above, the reset controller 27 monitors reading of the CPU configuration control information 30 from the system monitor 16 by the time-out detection mechanism 32, and if the time-out is detected, the system continues the setting-up processing as considering all the CPUs as normal. Therefore, when the time-out is detected, by continuing the setting-up processing while all the CPUs are considered as normal, the system is able to complete setting-up even if a fault occurs at the system monitor 16, and enhances its usage.

(4) Regarding to the description above, the reset controller 27 monitors the setting-up processings of the CPUs through the time-out detection mechanism 32, and if the time-out is detected, the fault occurrences of the CPUs are recorded in the CPU configuration control information 30. Therefore, by retaining the records of the defective CPUs in the system monitor 16, the system can use them for the following setting-up after the power is turned off and can also confirm the state of the defective CPUs at an arbitrary timing. The system, since automatically cutting off such CPUs from the following setting-up processing, can improve a task of its maintenance and reliance and shorten its setting-up time.

What is claimed is:

1. A multiprocessor system able to set up itself while cutting out defective CPUs from a common bus thereof, said system comprising:

a plurality of CPUs connected to the common bus;

a single ROM, provided to said common bus, for storing initialization program for setting-up the system when the power of the system is turned on;

a single nonvolatile RAM, provided to said common bus, for storing system configuration information indicating mounting status of the plurality of CPUs;

an identifier setting register, connected to said common bus, capable of assigning to and reading from an arbitrary CPU a CPU number, for designating assigned CPU numbers to the respective CPUs;

a reset controller, having start request information inputs corresponding to each CPU and having report information inputs corresponding to each CPU, and connected to each CPU through corresponding individual hardware reset lines, for controlling said CPUs individually into a reset state by separately enabling each said individual hardware reset line and into a setting-up state by separately disabling each said individual hardware reset line based on said start request information of each CPU, said reset controller having a time-out detection mechanism for monitoring completion of initialization of each CPU, stopping the operation of said time-out detection mechanism based on said report information indicating the completion of initialization of each CPU, and cutting off from the system, at a time of the time-out detection conducted by said time-out detection mechanism, the corresponding CPUs whose records indicates a fault occurrence, thereby initializing the multiprocessor system;

a reset status input port provided to the common bus and connected to read the status of each CPU individual hardware reset line, the reset status input port enabling an arbitrary CPU to read the read status through said common bus; and a reset information register, provided to the common bus, for holding said start request information of the selected CPUs and said report information of the completion of initialization of those CPUs given from an arbitrary CPU through said common bus, the reset information register further connected to said start request information inputs and said report information inputs of said reset controller, the reset information register enabling an arbitrary CPU to read said start request information and said report information through said common bus.

2. A multiprocessor system as claimed in claim 1, characterized in that said identifier setting register includes registers of a number corresponding to said CPUs connected to said common bus, and that all values of said identifier setting register are set to the CPU number of a master CPU in response to a system reset signal and, only at a register portion that said CPU individual hardware reset lines are enable, set to a value from said common bus.

3. A multiprocessor system as claimed in claim 1, characterized in that said reset controller maintains said CPU individual hardware reset line corresponding to CPUs which are to be cut off from the system, to be enable.

4. A multiprocessor system as claimed in claim 1, characterized in that said reset controller monitors the processing of setting-up of each CPU through said time-out detection mechanism and, when the time-out is detected, cuts off the CPUs from the processing of setting-up thereafter.

5. A multiprocessor system as claimed in claim 1, characterized in that said reset controller makes an arbitrary CPU implement instructions from the same address in said ROM for storing initialization program by rendering said CPU individual hardware reset line disable.

6. A multiprocessor system as claimed in claim 1, characterized in that said reset controller makes one CPU start as a master CPU, monitors the master CPU's processing of setting-up through said time-out detection mechanism, and, when the time-out is detected, retries the processing of setting-up after resetting all hardware except said reset controller.

7. A multiprocessor system as claimed in claim 6, characterized in that said master CPU recognizes itself as a master CPU when a corresponding individual hardware reset line has only 1 bit disabled and recognizes a corresponding physical CPU number from the position of the disabled bit.

8. A multiprocessor system as claimed in claim 7, characterized in that said master CPU selects, based on the CPU configuration information in said nonvolatile RAM, CPUs which start initialization processing as slave CPUs, determines the CPU number to set at said identifier setting register, and sequentially starts the initialization processing of each slave CPU upon confirming the completion of the initialization processing of a previously started slave CPU.

9. A multiprocessor system as claimed in claim 8, characterized in that said reset controller monitors the slave CPUs, processing of setting-up through said time-out detection mechanism, and, when the time-out is detected, retries the processing of setting-up from the master CPU after resetting all hardware except said reset controller.

10. A multiprocessor system as claimed in claim 7, characterized in that said slave CPU recognizes itself as a slave CPU when said CPU individual hardware reset line has 2 bits or more disabled.

11. A multiprocessor system as claimed in claim 1, characterized in that the system further comprises a system monitor, connected through a reset channel for transmitting data to and from said reset controller, having CPU configuration control information for retaining fault information of each CPU.

12. A multiprocessor system as claimed in claim 11, characterized in that said reset controller cuts off a defective CPU from the system based on said CPU configuration control information.

13. A multiprocessor system as claimed in claim 11, characterized in that said time-out detection mechanism of said reset controller monitors reading of said CPU configuration control information from said system monitor and further wherein when a time-out is detected, setting-up continues assuming all CPUs as normal.

14. A multiprocessor system as claimed in claim 11, characterized in that said time-out detection mechanism of said reset controller monitors the CPU's processing of setting-up, and, when the time-out is detected, records the fault occurrences of the CPUs to said CPU configuration control information.

15. A method of resetting a multiprocessor system including a plurality of CPUs, comprising the steps of:

designating in a register each of the plurality of CPUs;

selecting from among the CPUs designated, a master CPU;

starting the master CPU selected;

operating the master CPU to select from among the plurality of CPUs, a slave CPU;

starting the slave CPU selected;

during any previously recited step, determining one CPU of the plurality of CPUs to have a fault;

recording the CPU fault including an identification of the one CPU in a register;

inhibiting only the one CPU by asserting a reset line coupled to only the one of the plurality of CPUs; and operating the master CPU to load an initial program.

16. The method of claim 15, wherein the step of selecting a master CPU further comprises the steps of:

initializing a counter which designates a CPU by a value held therein;

repeatedly determining from a fault register whether a CPU designated by the counter has a fault;

incrementing the counter if the CPU designated by the counter has a fault; and identifying as the selected CPU, the CPU designated by the counter.

17. The method of claim 15, wherein the steps of starting each further comprise the steps of:

initializing the CPU selected;

timing the step of initializing;

determining a CPU to have a fault when the timing step exceeds a predetermined time.

18. A multiprocessor system having initialization apparatus, the system comprising:

a plurality of CPUs interconnected through a CPU bus, each CPU having a reset input and a designation input;

an identifier setting register, connected to communicate with the CPUs through the CPU bus and having CPU designation outputs connected to the designation inputs of the CPUs;

a reset status input port, connected to communicate with the CPUs through the CPU bus and having a plurality of reset inputs corresponding to the plurality of CPUs;

a reset information register, connected to communicate with the CPUs through the CPU bus and holding reset information corresponding to the plurality of CPUs; and a reset controller connected to the reset information register, to receive the reset information, and having CPU-specific reset outputs connected to the reset inputs of corresponding CPUs and to the reset inputs of the reset status input port.

19. The system of claim 18, wherein the identifier setting register includes a plurality of registers corresponding in number to the plurality of CPUs and wherein the identifier setting register further includes means responsive to a system reset signal for simultaneously loading each of the plurality of registers with a value designating each corresponding CPU as a master CPU.

20. The system of claim 18, wherein the reset controller further comprises:

time out detection means for determining when a CPU fails to start within a predetermined time.

21. The system of claim 20, wherein the reset controller starts one of the plurality of CPUs as a master CPU, the reset controller further comprising:

means for starting another of the plurality of CPUs, when the time out detection means determines the one of the CPUs has failed to start within the predetermined time.

22. The system of claim 20, wherein the reset controller starts one of the plurality of CPUs as a slave CPU, the reset controller further comprising:

means for disabling the one CPU, when the time out detection means determines the one CPU has failed to start within the predetermined time.

23. A multiprocessor system, comprising:

a CPU bus;

a plurality of CPUs connected to the CPU bus;

a general-purpose main memory connected to the CPU bus;

a ROM connected to the CPU bus, the ROM holding a power-on initialization program for the system;

a non-volatile RAM connected to the CPU bus, the non-volatile RAM holding system configuration data including mounting status of each of the plurality of CPUs;

a plurality of special-purpose registers, each having a first port connected to the CPU bus, the special-purpose registers holding reset status information for each of the plurality of CPUs and identification information for each of the plurality of CPUs and the special-purpose registers each further having a second port; and a reset controller connected through individual reset lines to each of the plurality of CPUs, the reset controller also connected to the second port of the special-purpose registers, whereby each of the plurality of CPUs may be reset and whereby each of the plurality of CPUs may be started when not exhibiting an error status.

24. The multiprocessor system of claim 23, further comprising:

a local bus connected to the CPU bus through a bus bridge, the local bus having connected thereto
(1) the ROM,
(2) the non-volatile RAM, and
(3) the plurality of special-purpose registers.

25. The multiprocessor system of claim 23, wherein the plurality of special-purpose registers further comprises:

an identifier register written by the reset controller with a mapping of each CPU to a logical CPU number;

a reset status port wherein each CPU reads reset status information about any CPU; and a reset information register, wherein each CPU writes information about reset processing which is then accessible to the reset controller.

26. The multiprocessor system of claim 25, wherein the identifier register further comprises:

a plurality of registers corresponding in number to the plurality of CPUs; and means responsive to a system reset signal for simultaneously loading each of the plurality of registers with a value designating each corresponding CPU as a master CPU.

27. The multiprocessor of claim 23, wherein the reset controller further comprises:

a time out detector which monitors each CPU during start up and produces a time out signal when a CPU fails to start within a predetermined time.

28. The multiprocessor system of claim 27, wherein the reset controller starts one of the plurality of CPUs as a master CPU, the reset controller further comprising:

means for starting another of the plurality of CPUs, when the time out detector determines the one of the CPUs has failed to start within the predetermined time.

29. The multiprocessor system of claim 27, wherein the reset controller starts one of the plurality of CPUs as a slave CPU, the reset controller further comprising:

means for disabling the one CPU, when the time out detector determines the one CPU has failed to start within the predetermined time.

* * * * *